(12) United States Patent
Oe

(10) Patent No.: US 10,168,944 B2
(45) Date of Patent: Jan. 1, 2019

(54) INFORMATION PROCESSING APPARATUS AND METHOD EXECUTED BY AN INFORMATION PROCESSING APPARATUS

(71) Applicant: FUJITSU LIMITED, Kawasaki-shi, Kanagawa (JP)

(72) Inventor: Kazuichi Oe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 173 days.

(21) Appl. No.: 15/344,691

(22) Filed: Nov. 7, 2016

(65) Prior Publication Data

US 2017/0153845 A1 Jun. 1, 2017

(30) Foreign Application Priority Data

Nov. 27, 2015 (JP) .................................. 2015-231455

(51) Int. Cl.
*G06F 12/00* (2006.01)
*G06F 3/06* (2006.01)

(52) U.S. Cl.
CPC .......... *G06F 3/0647* (2013.01); *G06F 3/0611* (2013.01); *G06F 3/0653* (2013.01); *G06F 3/0683* (2013.01)

(58) Field of Classification Search
CPC .... G06F 3/0647; G06F 3/0611; G06F 3/0683; G06F 3/0653
See application file for complete search history.

(56) References Cited

U.S. PATENT DOCUMENTS

| 2003/0140207 A1 | 7/2003 | Nagase et al. |
| 2007/0220149 A1* | 9/2007 | Kawashima ........ H04L 67/1008 709/226 |
| 2013/0219144 A1 | 8/2013 | Oe et al. |
| 2014/0244959 A1 | 8/2014 | Oe et al. |
| 2014/0297971 A1 | 10/2014 | Oe et al. |
| 2014/0351504 A1 | 11/2014 | Kawaba et al. |

FOREIGN PATENT DOCUMENTS

| JP | 9-214935 | 8/1997 |
| JP | 2003-216460 | 7/2003 |
| JP | 2013-171305 | 9/2013 |
| JP | 2014-164510 | 9/2014 |
| JP | 2014-191503 | 10/2014 |
| JP | 2014-229144 | 12/2014 |

* cited by examiner

*Primary Examiner* — Kalpit Parikh
(74) *Attorney, Agent, or Firm* — Fujistu Patent Center

(57) ABSTRACT

An information processing apparatus controlling moving of data stored in a first storage region selected from a plurality of storage regions of a first storage device to a second storage device, the apparatus is configured to execute a collection of logs of accesses, specify the first storage region as an access concentration region based on the logs, move first data stored in the first storage region to the second storage device, specify a transition speed of the access concentration region, specify a first time period until the number of the accesses to the first storage region becomes the first number, at a first time, execute a prediction procedure predicting that the number of accesses to a second region becomes equal to or greater than the first number at a second time after the first time, based on the transition speed and the first time period.

17 Claims, 30 Drawing Sheets

| SEGMENT | NUMBER OF IOS | TIMESTAMP |
|---------|---------------|-----------|
| 0 | 1000 | 1 |
| 1 | 1200 | 3 |
| : | : | : |

| SSD OFFSET | HDD OFFSETS | STATE |
|---|---|---|
| 0 | 268435456 | ALLOCATED |
| 2097152 | 306184192 | MOVING (HDD→SSD) |
| 4194304 | 505413632 | MOVING (SSD→HDD) |
| 6291456 | NULL | FREE |
| ⋮ | ⋮ | ⋮ |

| SEGMENT | TIMESTAMP |
|---------|-----------|
| 10 | xxxxxx...x |
| 20 | yyyyyy...y |
| : | : |

FIG. 12

| SSD CONSUMPTION AMOUNT (GB) | 106 | 99 | 90 | 75 | 66 |
|---|---|---|---|---|---|
| USER IO THRESHOLD VALUE (ms) | 80 | 100 | 150 | 200 | 250 |
| RESPONSE TIME IN PREDICTED MOVING CONTROL AND OBSERVATION MOVING CONTROL (ms) | 16.8 | 18.3 | 21.5 | 25.8 | 29.5 |
| RESPONSE TIME IN FACEBOOK FlashCache (ms) | 23.8 | 26.7 | 25.3 | 26.5 | 25.1 |

| Elapsed times (min) | sub_LUN_IDs whose 10s are top to 20th. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| 18 | 95 | 94 | 93 | 3 | 92 | 90 | 77 | 88 | 76 | 89 | 2 | 91 | 148 | 74 | 180 |
| 19 | 95 | 94 | 87 | 3 | 90 | 96 | 77 | 88 | 93 | 2 | 92 | 184 | 76 | 182 | 180 |
| 20 | 96 | 88 | 89 | 3 | 87 | 95 | 77 | 2 | 182 | 94 | 93 | 92 | 184 | 180 | 111 |
| 21 | | | | | | | | | | | | | | | |
| 22 | | | | | | | | | | | | | | | |
| 23 | | | | | | | | | | | | | | | |
| 24 | | | | | | | | | | | | | | | |
| ... | | | | | | | | | | | | | | | |

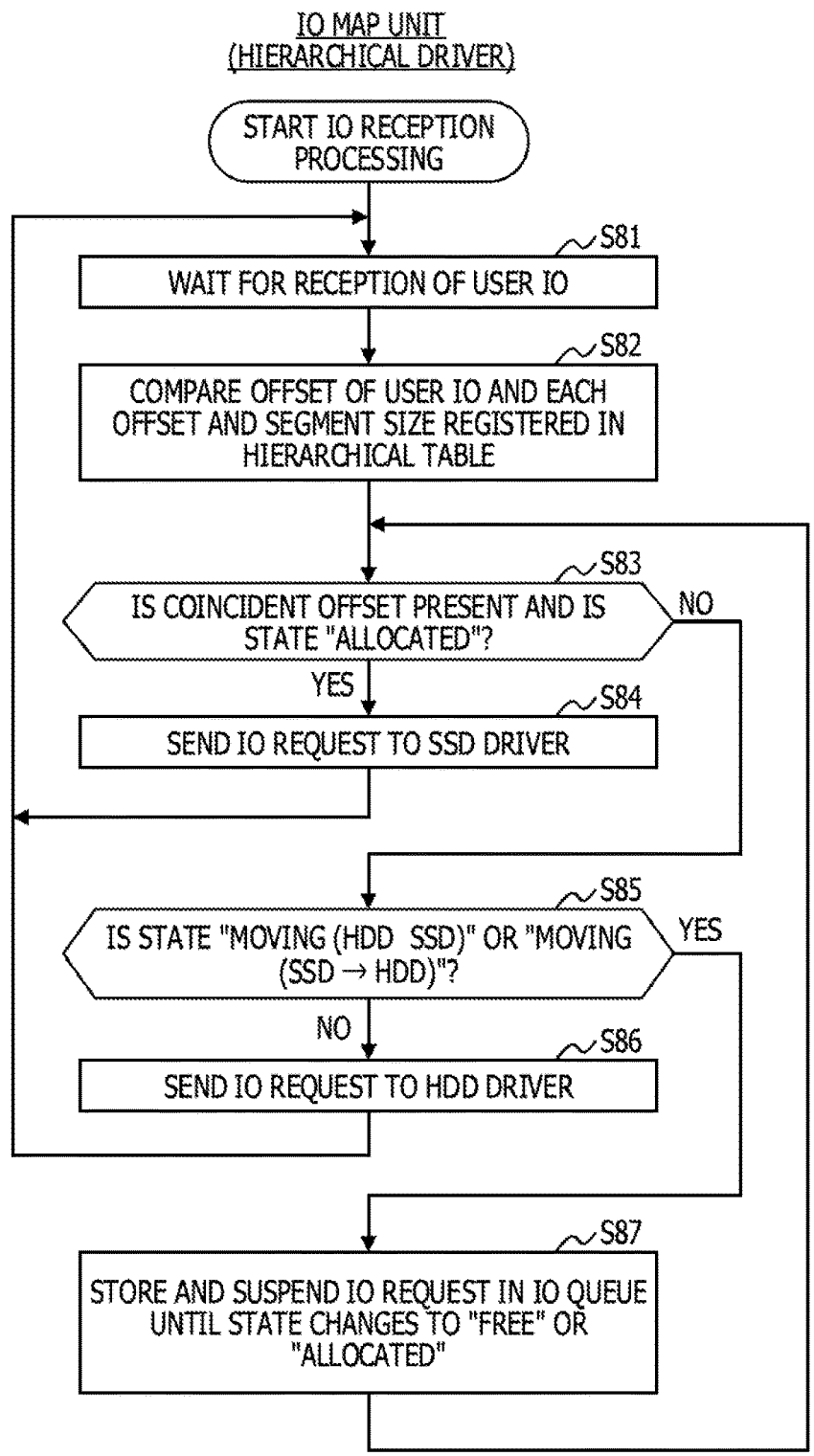

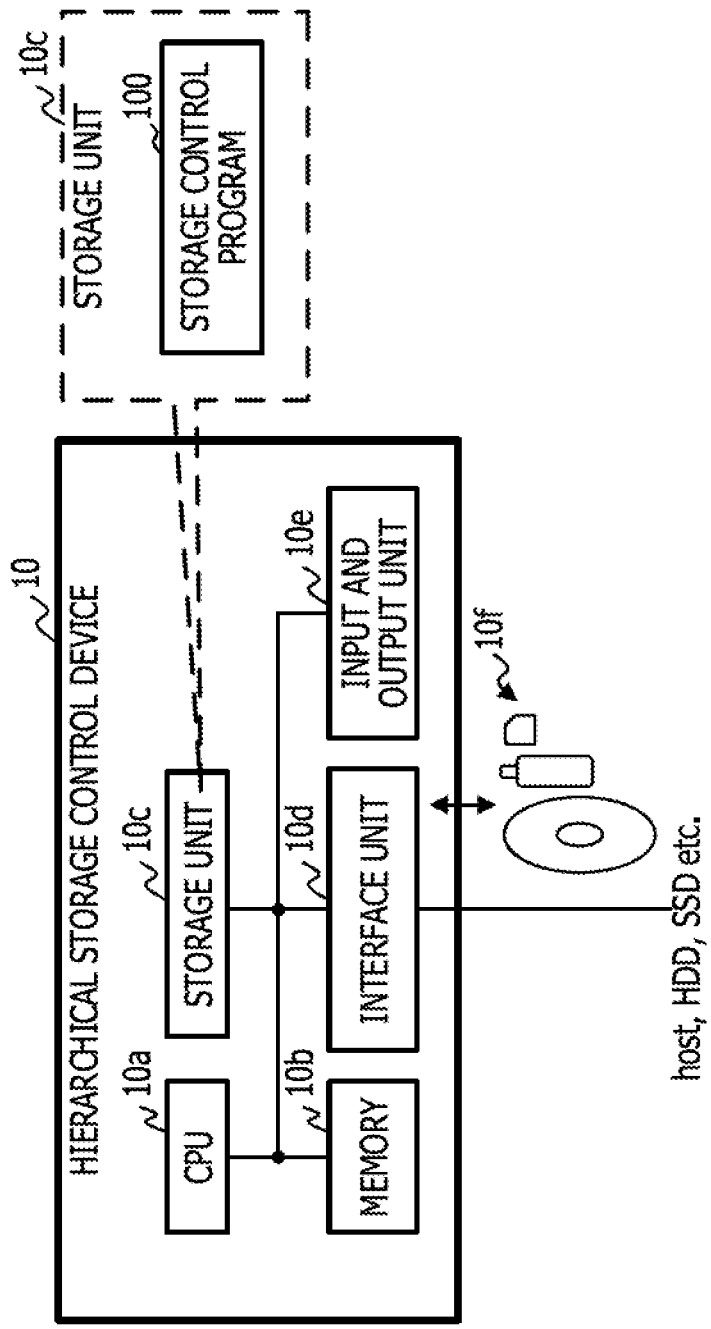

INFORMATION PROCESSING APPARATUS AND METHOD EXECUTED BY AN INFORMATION PROCESSING APPARATUS

CROSS-REFERENCE TO RELATED APPLICATION

This application is based upon and claims the benefit of priority of the prior Japanese Patent Application No. 2015-231455, filed on Nov. 27, 2015, the entire contents of which are incorporated herein by reference.

FIELD

The embodiment discussed herein is related to an information processing apparatus and a method executed by an information processing apparatus.

BACKGROUND

A hierarchical storage system as a combination of a plurality of storage media (storage devices) is used as a storage system that stores data in some cases. Examples of the plurality of media include a Solid State Drive (SSD) that allows for a high-speed access but has relatively low capacity and is expensive and a Hard Disk Drive (HDD) that has high capacity and is inexpensive but operates at a relatively low speed.

In a hierarchical storage system, it is possible to enhance efficiency of use of the SSD and to enhance a performance of the entire system by arranging data in a storage region that is less frequently accessed in the HDD and arranging data in a storage region that is more frequently accessed in the SSD. Therefore, it is preferable to efficiently arrange the data in the storage region that is more frequently accessed in the SSD in order to enhance the performance of the hierarchical storage system.

As a method of arranging the data that is frequently accessed in the SSD, a method of arranging a region that is frequently accessed on a day basis in the SSD in accordance with access frequency in the previous day is known, for example.

However, there is a case in which input and output (IO) requests (hereinafter, also simply referred to as IO) concentrate on a small range in a storage region for relatively short time, such as several minutes to several tens of minutes, and the requests move to another region with time in a pattern of accesses to the storage system that is used for file sharing or the like. It is difficult for counting of access frequency for a long period of time, such as a day, to follow such a workload by in many cases. The workload is an index that indicates distribution (a use state of the storage devices) of accesses to the storage devices and varies in accordance with elapse of time and offset positions (storage regions) of the storage devices.

As a technology for handling the workload in a case where a load moves for short time, a technology of monitoring occurrence of IO concentration and moving the region where the IO concentration has occurred from the HDD to the SSD every time the IO concentration occurs is known. According to this technology, it is possible to quickly move the region where the next IO concentration has occurred to the SSD by moving the region, which has been moved to the SSD, to the HDD and clearing the SSD region once IO concentration has been settled. A technology of determining a region obtained by coupling regions in the vicinity of a high-load region as a moving target region at this time is also known.

As prior art documents, Japanese Laid-open Patent Publication Nos. 2014-164510, 2014-191503, 2014-229144, 2013-171305, 9-214935, and 2003-216460 are exemplified.

SUMMARY

According to an aspect of the invention, an information processing apparatus configured to control moving of data stored in a first storage region selected from a plurality of storage regions of a first storage device to a second storage device, the apparatus includes a memory and a processor coupled to the memory and configured to execute a collection of logs of accesses to the plurality of storage regions respectively, specify, based on the logs of the accesses, the first storage region as an access concentration region in which a number of the accesses per a certain time unit is equal to or greater than a first number from among the plurality of storage regions, move first data stored in the first storage region to the second storage device, specify, based on the logs of the accesses, a transition speed of the access concentration region when the access concentration region is transited between the plurality of storage regions, specify, based on the logs of the accesses, a first time period until the number of the accesses to the first storage region has been brought into a state where the number of the accesses is equal to or greater than the first number from a state where the number of accesses is equal to or less than a second number smaller than the first number, at a first time, execute a prediction procedure predicting that the number of accesses to a second region included in the plurality of storage regions becomes equal to or greater than the first number at a second time after the first time, based on the transition speed and the first time period, and move second data stored in the predicted second storage region to the second storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a data structure of IODB;

FIG. 4 is a diagram illustrating an example of a data structure of a hierarchical table;

FIG. 10 is a diagram illustrating an example of a data structure of a prediction segment;

FIG. 12 is a diagram illustrating an example of a relationship between a consumption amount of an SSD and average response time in dynamic hierarchical control according to an embodiment;

FIG. 18 is a specific explanatory diagram of the transition speed calculation method performed by the transition speed calculation unit;

FIG. 19 is an explanatory diagram specifically illustrating a growth time calculation method performed by a growth time calculation unit;

FIG. 29 is an explanatory flowchart of an operation example of IO reception processing performed by an IO map unit; and FIG. 30 is a diagram illustrating a hardware configuration example of a hierarchical storage control device illustrated in FIG. 1.

DESCRIPTION OF EMBODIMENT

Figure 1:
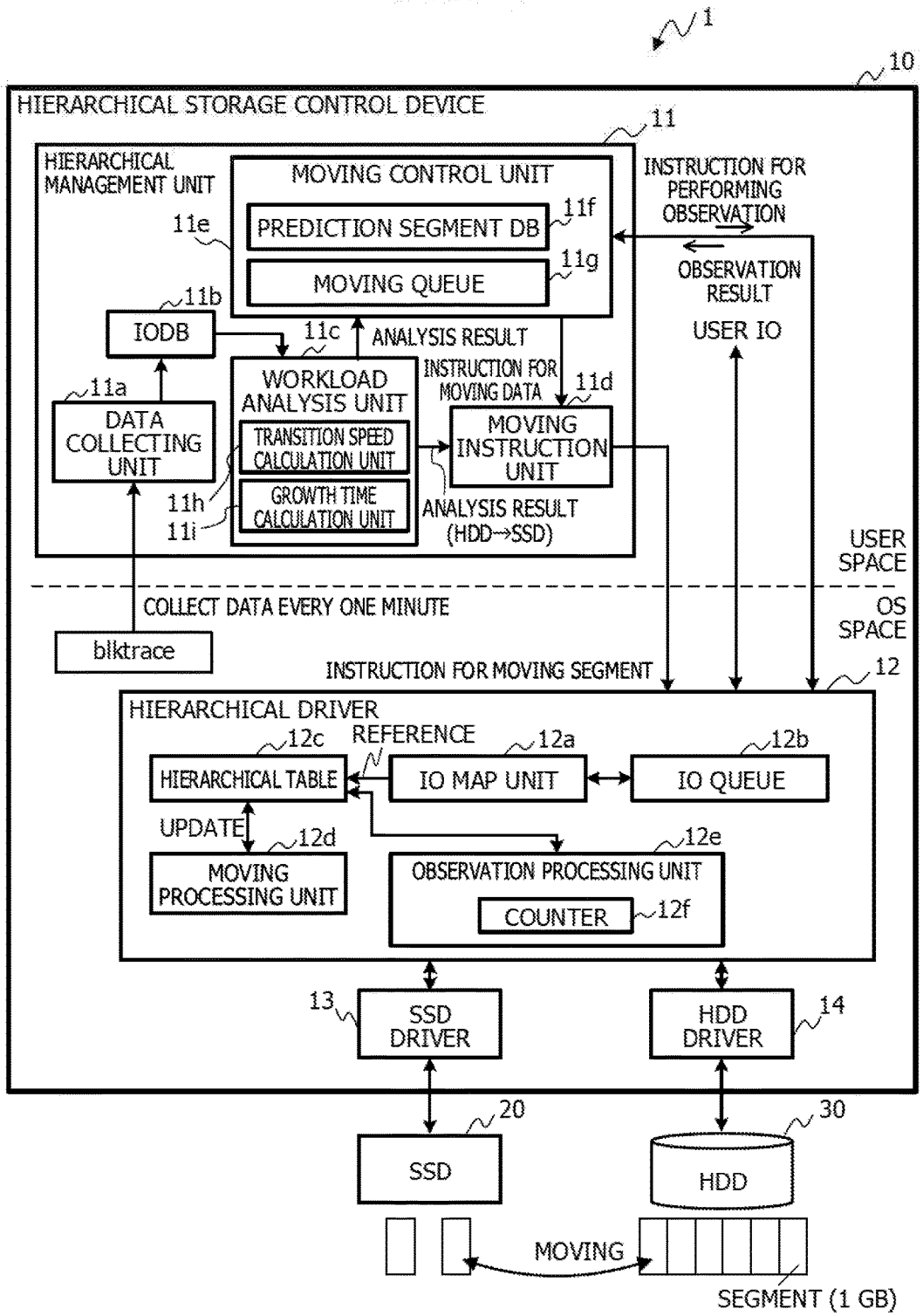
FIG. 1 is a diagram illustrating a configuration example of a hierarchical storage system as an exemplary embodiment.

In addition to the technology of moving the data in the region where the IO concentration has occurred from the HDD to the SSD every time the IO concentration occurs, a technology of predicting a region on which IO will concentrate in a near future and moving data in the region to the SSD before the IO concentration, which is called predicted moving, is also known.

However, since a parameter used for predicting the IO concentration region is obtained in advance by analyzing a workload and statically set in the predicted moving technology under a current situation, it is difficult to precisely predict and follow the transiting IO concentration region. Correspondingly, it is difficult to appropriately move the data in the IO concentration region to the SSD before the IO concentration and to expect enhancement in a performance by the predicted moving in some cases.

Hereinafter, description will be given of an embodiment of the disclosure with reference to drawings. However, the embodiment described below will be presented only for the illustrative purpose and will not be intended to exclude various modifications and technical applications that will not be explicitly described below. That is, the embodiment can be modified in various manners without departing from the gist thereof. Components with the same reference numerals are the same or similar components in the drawings used in the following embodiment unless otherwise particularly stated.

[1] First Embodiment

[1-1] Configuration Example of Hierarchical Storage System

FIG. 1 is a diagram illustrating a configuration example of a hierarchical storage system 1 according to an exemplary embodiment. As illustrated in FIG. 1, the hierarchical storage system 1 can include a hierarchical storage control device 10, one or more (one in FIG. 1) SSD 20, and one or more (one in FIG. 1) HDD 30 in one illustrative example.

The hierarchical storage system 1 is an example of a storage device including a plurality of storage devices. The hierarchical storage system 1 mounts a plurality of storage devices with different performances, such as the SSD 20 and the HDD 30, and can provide storage regions in hierarchical storage devices to a host device that is not illustrated in FIG. 1. In one example, the hierarchical storage system 1 save data in the plurality of storage devices in a distributed or redundant state by using Redundant Arrays of Inexpensive Disks and can provide one or more storage volumes (Logical Unit Number (LUN)) based on a RAID group to the host device.

The hierarchical storage control device 10 can accesses the SSD 20 and the HDD 30 such as reading or writing in accordance with a USER IO from the host device or the like via a network. Examples of the hierarchical storage control device 10 include a Personal Computer (PC), a server, or an information processing apparatus (computer) such as a Controller Module (CM).

The hierarchical storage control device 10 according to the embodiment can perform dynamic hierarchical control in which a region that is less frequently accessed is arranged in the HDD 30 while the region that is more frequently accessed is arranged in the SSD 20 in accordance with the access frequency of the user IO. As described above, the hierarchical storage control device 10 is an example of an information processing apparatus that moves data in a plurality of segments (unit regions) between the SSD 20 and the HDD 30.

The hierarchical storage control device 10 can use a function of device-mapper as a module (program) installed on Linux (registered trademark). For example, the hierarchical storage control device 10 can process IO on a high-load segment by monitoring a storage volume in units of segments (sub_LUN) by the device-mapper and moving data in a segment under a high load from the HDD 30 to the SSD 20.

Here, the segment is a region obtained by dividing the storage volume into predetermined sizes and a region (unit region) of the minimum unit for hierarchical moving in the dynamic hierarchical control. For example, the segment can have a size of about 1 GB (Byte).

The SSD 20 is an example of the storage device that stores various kinds of data, programs, and the like, and the HDD 30 is an example of the storage device that has a different performance (operating at a lower speed, for example) from that of the SSD 20. Although a semiconductor drive device such as the SSD 20 and a magnetic disk device such as the HDD 30 are exemplified as mutually different storage devices (hereinafter, referred to as first and second storage devices for convenience) in one embodiment, the storage devices are not limited thereto. As the first and second storage devices, various storage devices with a difference in performances, such as a difference in speeds of reading and writing, may be used.

The SSD 20 and the HDD 30 includes storage regions capable of storing data in segments on storage volumes, and the hierarchical storage control device 10 can control moving of regions between the SSD 20 and the HDD 30 in units of segments.

Although the hierarchical storage system 1 includes one SSD 20 and one HDD 30 in the example illustrated in FIG. 1, the numbers thereof are not limited thereto, and a plurality of SSDs 20 and a plurality of HDDs 30 may be provided.

[1-2] Functional Configuration Example of Hierarchical Storage Control Device

Next, description will be given of a functional configuration example of the hierarchical storage control device 10.

As illustrated in FIG. 1, the hierarchical storage control device 10 can include a hierarchical management unit 11, a hierarchical driver 12, an SSD driver 13, and an HDD drive 14 in an illustrative example. The hierarchical management unit 11 is realized as a program that is executed in a user space, and the hierarchical driver 12, the SSD driver 13, and the HDD driver 14 may be realized as programs that are executed in an Operating System (OS) space.

The hierarchical management unit 11 can determine a segment from which a region is to be moved based on IO information traced in relation to the storage volume and provide an instruction for moving data in the determined segment to the hierarchical driver 12. For tracing the IO, blktrace as a command for tracing the IO in a block IO level may be used. Instead of blktrace, iostat as a command for checking a use status of a disk IO may be used. blktrace and iostat are executed in an OS space.

The hierarchical management unit 11 can have functions as a data collecting unit 11a, an IO Database (DB) 11b, a workload analysis unit 11c (a transition speed calculation unit 11h and a growth time calculation unit 11i), a moving instruction unit 11d, and a moving control unit 11e in an illustrative example. These functions can be realized by a CPU 10a (see FIG. 30) in the hierarchical storage control device 10 executing a storage control program 100 (see FIG. 30).

The data collecting unit 11a can collect and count the IO information traced by using blktrace at a predetermined interval (at every one minute, for example) and stores the result of the counting along with a timestamp as an access log in the IODB 11b.

The IO information counted by the data collecting unit 11a may include information for specifying a segment and counted number of IOs for each segment based on the collected IO information.

The IODB 11b stores information related to the number of IOs for each segment counted by the data collecting unit 11a and is realized by a memory, for example, which is not illustrated in FIG. 1.

FIG. 2 is an example illustrating an example of the IODB 11b illustrated in FIG. 1. As illustrated in FIG. 2, the IODB 11b may associate and store the information for specifying a segment, the number of IOs, and the timestamp for each segment. In one example, the total number of IOs is set to "1000", and the time stamp "1" is set for a segment "0" in the IODB 11b.

As described above, the data collecting unit 11a is an example of a collecting unit that collects an access log (the number of IOs) for each of the plurality of segments at predetermined timing at a specific time interval (at every 1 minute, for example).

Although a segment number (identifier: ID) is used as the information for specifying the segment, a head offset of a storage volume may be used instead of the segment number. The number of IOs is a total number of IOs in a segment for one minute (IO per minute: iopm). The timestamp is an identifier for identifying a clock time, and for example, a clock time itself may be set. Hereinafter, the segment number for specifying a segment may be described as a segment ID, sub_LUN_ID, or seg_id in some cases.

The workload analysis unit 11c can select a segment, the data in which is to be moved to the SSD 20 or the HDD 30, from among segments stored in the IODB 11b and provides information related to the selected segment to the moving instruction unit 11d or the moving control unit 11e.

In one example, the workload analysis unit 11c can extract segments in an order from a larger number of IOs as segments, the data in which is to be moved to the SSD 20, until the segment numbers reach the maximum segment number (predetermined number) for hierarchical moving at the same time.

The segment extraction performed by the workload analysis unit 11c may include extraction of a segment in which the number of IOs or an access concentration rate (a rate of the number of IOs with respect to the total number) is higher than a predetermined threshold value. The segment extraction may include extraction of a segment, in which the number of IOs is less than the aforementioned predetermined number or the number of IOs or the access concentration rate is equal to or less than a predetermined threshold value, for example, in the SSD 20 as the segment, the data in which is to be moved to the HDD 30.

Furthermore, the segment extraction may include extraction of a segment that has continuously met a segment extraction condition for moving data to the SSD 20 or the HDD 30 a predetermined number of times or more, as the segment, the data in which is to be moved to the SSD 20 or the HDD 30. Instead of the aforementioned number of IOs or the like, a segment may be selected based on a reading and writing ratio (rw ratio).

Here, the workload analysis unit 11c can provide, to the moving instruction unit 11d, an instruction for performing hierarchical moving of a segment in the HDD 30 to the SSD 20 and then to provide, to the moving control unit 11e, an instruction for performing hierarchical moving of another segment in the SSD 20 to the HDD 30. In contrast, in a case where a load on a specific segment is expected to decrease during hierarchical moving of the segment to the SSD 20, the workload analysis unit 11c may suppress hierarchical moving of the segment to the HDD 30 and provide an instruction for performing hierarchical moving of another segment to the HDD 30.

For example, the workload analysis unit 11c can determine whether or not a load on a segment during hierarchical moving decreases based on average life expectancy of spike and time taken for the hierarchical moving. The spike means concentration of a load on a partial segment, and the average life expectancy is time obtained by subtracting finished execution time from continuing time when the load continues and is a value determined in accordance with a workload. A manager or the like can obtain and set the average life expectancy in the hierarchical storage control device 10 in advance.

Specifically, the workload analysis unit 11c extracts a segment, the data in which is to be moved to the SSD 20, and calculates a cost (time) for moving the data in the extracted segment to the SSD 20. Then, in a case where the average life expectancy is equal to or less than the moving time, the workload analysis unit 11c can determine to perform hierarchical moving from the SSD 20 to the HDD 30 without performing the hierarchical moving from the HDD 30 to the SSD 20.

Although such processing by the workload analysis unit 11c may be performed at predetermined timing, there is also a case where the segment, the data in which is to be moved from the HDD 30 to the SSD 20, or the segment, the data in which is to be moved from the SSD 20 to the HDD 30, is not extracted and information thereof is not provided in some period of time. In such a case, the workload analysis unit 11c may not provide information to the moving control unit 11e or may provide information indicating that no segment has been selected. The predetermined timing may include timing that arrives at an every predetermined period such as every one minute.

As described above, the workload analysis unit 11c is an example of a determination unit that determines a unit region in an access concentration state as a unit region as a target of moving from the HDD 30 to the SSD 20 from among a plurality of segments based on the number of IOs (access log) for each segment in the HDD 30 at predetermined timing. The workload analysis unit 11c as the determination unit can determine the unit region as the target of the moving of data to the HDD 30 from among the plurality of segments obtained by dividing the storage region in the SSD 20 into the first size. The workload analysis unit 11c can provide an instruction for moving the determined unit region to the moving instruction unit 11d.

Furthermore, the workload analysis unit 11c can include a transition speed calculation unit 11h and a growth time calculation unit 11i in an illustrative example.

The transition speed calculation unit 11h calculates a transition speed of the segment in the access concentration state from among the plurality of segments based on an access log saved in the IODB 11b at every predetermined timing at a specific time interval. The calculated transition speed is set, registered, and saved in a memory, for example, which is not illustrated in FIG. 2. The transition speed, a calculation method thereof, and a calculation procedure thereof will be described later with reference to FIGS. 8, 16 to 18 and 20. Hereinafter, the transition speed will be described as "proactive migration (pm)_speed" in some cases.

The growth time calculation unit 11i calculates growth time until the segment in the access concentration state at predetermined timing is brought into the access concentration state from a state where the segment is substantially not accessed, based on the access log saved in the IODB 11b at predetermined timing at the specific time interval. The state where the segment is substantially not accessed is defined as a state where the number of accesses (the number of IOs) to the segment per unit time is equal to or less than a predetermined value, for example. Here, although it is considered that the unit time is set to sixty seconds and the predetermined value is set to twenty, for example, the unit time and the predetermined value are not limited to these values. The calculated growth time is set, registered, and saved in a memory, for example, which is not illustrated in FIG. 2. The growth time, a calculation method thereof, and a calculation procedure thereof will be described later with reference to FIGS. 8, 19, and 21. Hereinafter, the growth time will be described as "pm_growth" in some cases. The access concentration state may be defined as a state where the number of accesses (the number of IOs) to the segment per unit time is equal to or greater than a different predetermined value that is greater than the aforementioned predetermined value.

The moving instruction unit 11d can provide, to the hierarchical driver 12, an instruction for moving the data in the selected segment from the HDD 30 to the SSD 20 or moving the data from the SSD 20 to the HDD 30 based on an instruction from the workload analysis unit 11c or the moving control unit 11e.

The instruction for moving the data by the moving instruction unit 11d may include an instruction for converting an offset on a storage volume of the selected segment into an offset on the HDD 30 and moving the data for each segment. In a case where a sector size of the HDD 30 is 512 B and the offset on the volume is 1 GB, for example, the offset on the HDD 30 is 1×1024×1024×1024/512=2097152.

The moving control unit 11e performs control, which will be described later with reference to FIG. 9, in order not to cause deterioration of IO response in a case where a user IO occurs when the hierarchical moving for each segment based on the aforementioned number of IOs occurs. The moving control unit 11e can include a prediction segment DB 11f and a moving queue 11g in an illustrative example.

Figure 3:
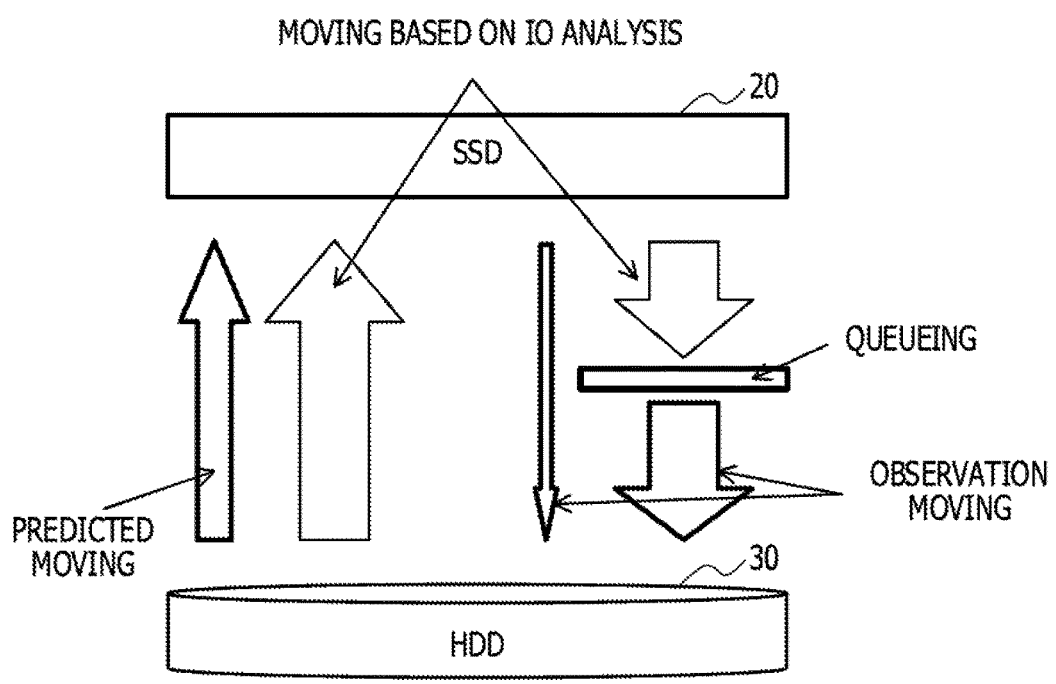
FIG. 3 is an explanatory diagram of an example of control performed by a moving control unit.

FIG. 3 is an explanatory diagram of an example of control performed by the moving control unit 11e. The hierarchical moving between the SSD 20 and the HDD 30 is performed by the workload analysis unit 11c analyzing the number of IOs (access log) as illustrated by the arrow of "moving by IO analysis" in FIG. 3. The moving control unit 11e can perform predicted moving (proactive migration) control processing and observation moving (observational migration) control processing in addition to the moving by the IO analysis.

In the predicted moving control, it is possible to predict a segment on which IOs will concentrate (the number of IOs will increase) in the near future and move the segment to the SSD 20 before the concentration of the IOs in addition to the moving of data from the HDD 30 to the SSD 20 by the IO analysis. Since data in the segment can be shifted to the SSD 20 before the concentration of the IOs by the predicted moving control, it is possible to reduce an influence on the user IOs as compared with moving of data in a segment on which the IO has concentrated by analyzing the number of IOs. In the predicted moving control according to the embodiment, a transition destination segment to which the segment in the access concentration state will transit from the segment as a target of moving determined by the workload analysis unit 11c is predicted at this time based on the transition speed and the growth time registered and saved in the memory or the like which is not illustrated in FIG. 3. Then, data in the predicted transition destination segment is moved to the SSD 20.

In the observation moving control, it is possible to execute hierarchical moving of a sufficiently smaller size than the segment size prior to the execution of the moving from the SSD 20 to the HDD 30 by the IO analysis, to detect timing at which less load is applied on the HDD 30, and to perform moving by the IO analysis at the detected timing. The observation moving control can reduce an influence on the user IOs as compared with a case of executing the moving immediately after the determination of the segment as a target of the moving by the IO analysis.

Detailed description will be given later of the predicted moving control and the observation moving control.

The hierarchical driver 12 can include an IO map unit 12a, an IO queue 12b, a hierarchical table 12c, a moving processing unit 12d, and an observation processing unit 12e in an illustrative example.

The IO map unit 12a can process IO requests from the host device to the storage volume. For example, the IO map unit 12a performs processing of allocating the IO requests to the SSD driver 13 or the HDD driver 14 by using the hierarchical table 12c and returning IO responses from the SSD driver 13 or the HDD driver 14 to the host device.

The IO queue 12b is a storage region with a First-In First-Out (FIFO) structure that temporarily stores the IO requests and is realized by a memory, for example, which is not illustrated in FIG. 3.

In one example, if an IO request is issued to a segment under hierarchical moving, then the IO map unit 12a stores and suspends the IO request in the IO queue 12b until the moving of the data in the segment is completed. If the moving of the data is completed, the IO map unit 12a reads the IO request from the IO queue 12b and restarts the allocation to the SSD driver 13 or the HDD driver 14.

The hierarchical table 12c is a table used for the allocation of the IO requests by the IO map unit 12a and the hierarchical control by the moving processing unit 12d or the like and is realized by a memory, for example, which is not in FIG. 3.

One example of a data structure in the hierarchical table 12c will be illustrated in FIG. 4. As illustrated in FIG. 4, the hierarchical table 12c can associate and store an SSD offset, an HDD offset, and a state for each segment, from which data has been moved to the SSD 20.

The SSD offset represents an offset of the segment, from which the data has been moved to the SSD 20, in the SSD 20. The SSD offset is a fixed value in units of an offset "2097152" corresponding to the segment size (1 GB, for example) on the volume and is "0", "2097152", "4194304", "6291456", . . . , for example.

The HDD offset represents an offset of the segment, from which the data has been moved to the SSD 20, in the HDD 30. A value "NULL" of the HDD offset represents that a region in the SSD 20 designated by the SSD offset is unused.

The state represents a state of a segment and includes "allocated", "Moving (HDD→SSD)", "Moving (SSD→HDD)", or "free". "allocated" represents that the segment has been allocated to the SSD 20, and "Moving (HDD→SSD)" represents that the data in the segment is being transferred from the HDD 30 to the SSD 20. "Moving (SSD→HDD)" represents that the data in the segment is being transferred from the SSD 20 to the HDD 30, and "free" represents that a region in the SSD 20 designated by the SSD offset is unused.

The IO map unit 12a can determine which of the SSD driver 13 and the HDD driver 14 the IO requests are to be allocated and whether or not the IO requests are being moved between segments by referring to the aforementioned hierarchical table 12c.

The moving processing unit 12d can receive an instruction for moving the segment from the moving instruction unit 11d and then execute moving processing of moving data stored in a unit region as a target of moving in the HDD 30 or the SSD 20 to the SSD 20 or the HDD 30. At this time, the moving processing unit 12d moves the data in the segment designated by the instruction for moving the segment between the SSD 20 and the HDD 30 by referring to the hierarchical table 12c.

More specifically, the moving processing unit 12d receives the instruction for moving the segment, then searches for an entry of "NULL" in the HDD offset in the hierarchical table 12c, and registers HDD offset information designated by the instruction for moving the segment and the state. The state registered at this time is "Moving (HDD→SDD)" or "Moving (SSD→HDD)". Then, the moving processing unit 12d issues an instruction for transferring the data between the SSD 20 and the HDD 30 to the kcopyd.

If transfer of the data in all the regions is completed by kcopyd, then the moving processing unit 12d searches for an entry, for which the transfer has been completed, from the hierarchical table 12c, and in a case where the state is "Moving (HDD→SSD)", the moving processing unit 12d changes the state to "allocated". In contrast, in the case where the state is "Moving (SSD→HDD)", the moving processing unit 12d changes the state to "free" and sets the corresponding HDD offset to "NULL".

In addition, kcopyd is a module (program) that is mounted on device-mapper and executes data copy between devices, and is executed in an OS space.

As described above, the moving instruction unit 11d and the moving processing unit 12d moves the data stored in the region indicated by the workload analysis unit 11c or the moving control unit 11e between the SSD 20 and the HDD 30 for each segment.

The observation processing unit 12e can perform hierarchical moving of a sufficiently smaller size than the segment size from the SSD 20 to the HDD 30 in accordance with an instruction for moving data (observation moving instruction) from the moving control unit 11e and observe a user IO response at that time.

Detailed description will be given later of the observation processing unit 12e.

The SSD driver 13 controls an access to the SSD 20 based on an instruction from the hierarchical driver 12. The HDD driver 14 controls an access to the HDD 30 based on an instruction from the hierarchical driver 12.

[1-3] Description of Predicted Moving Control

Next, detailed description will be given of the predicted moving control with reference to FIGS. 5 to 10.

If a partial storage workload in a file system with software, such as Samba, mounted thereon is analyzed, it is possible to recognize that a half or more of all IOs occurs in a region corresponding to several % or less of total storage capacity for about ten to fifty minutes and then moves to another region.

Figure 5:
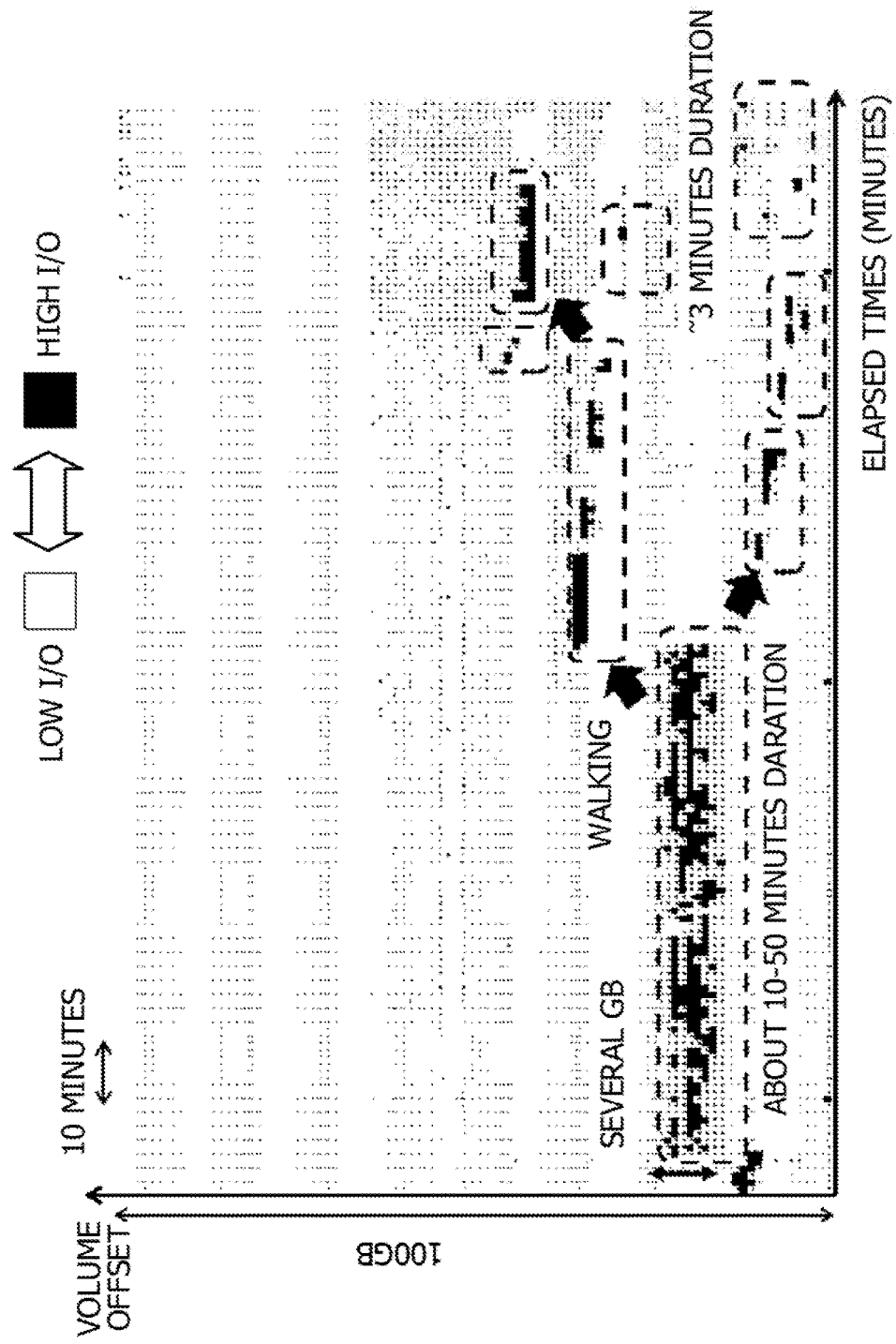
FIG. 5 is a diagram illustrating an example of workload analysis.

FIG. 5 is a diagram illustrating an analysis example of a storage workload in a system with total capacity of 4.4 TB. As illustrated in FIG. 5, it is possible to recognize that a half or more of all IOs concentrates on a region of several GB for about ten to fifty minutes and the IO concentration then moves to another region (volume offset, Logical Block Address: LBA).

According to the IO analysis including the aforementioned workload analysis unit 11*c*, it is possible to enhance the performance by extracting the IO concentration as illustrated in FIG. 5 every time such IO concentration occurs and moving the IOs to a high-speed storage such as the SSD 20.

Figure 6:
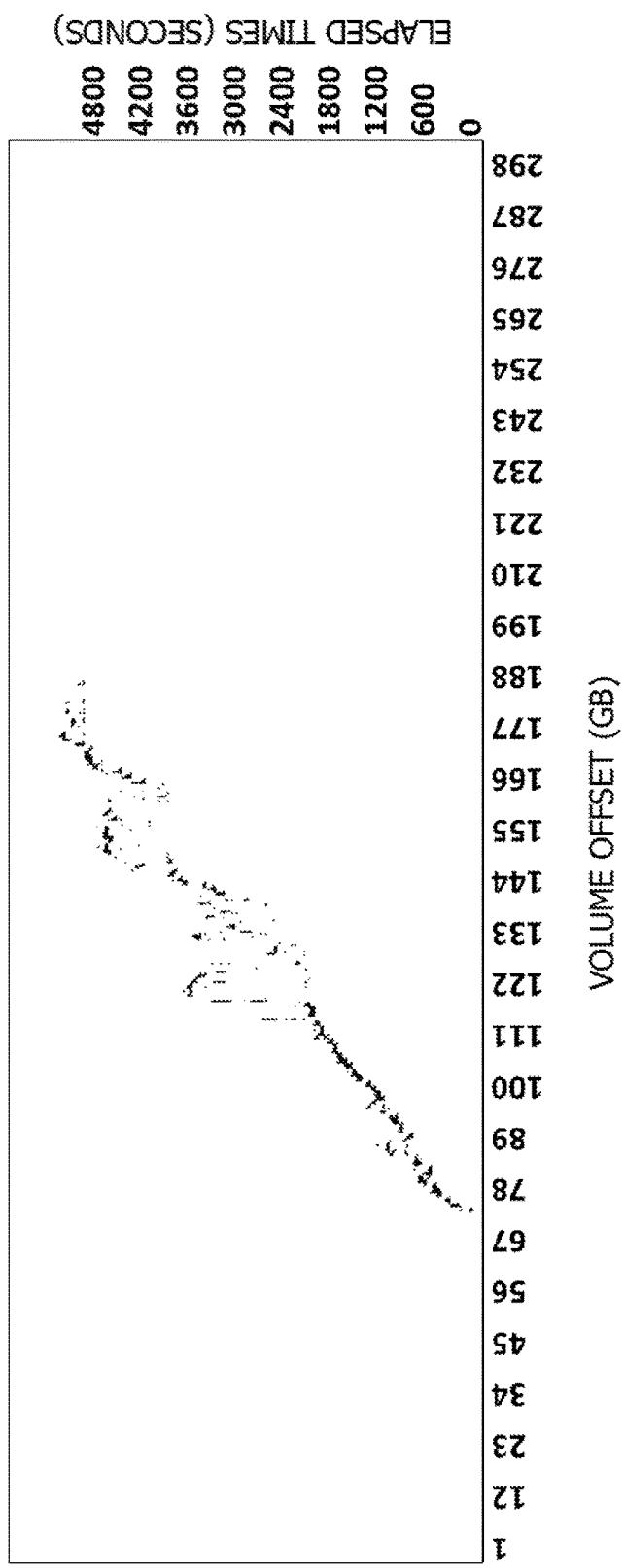
FIG. 6 is a diagram illustrating an example of workload analysis.

FIG. 6 is a diagram illustrating an analysis example of a storage workload that is different from that in FIG. 5. It is possible to easily understand from FIG. 6 tat LBA where IO concentration occurs move with elapse of time. In addition, it is possible to recognize that a moving speed of the LBA is a substantially uniform speed.

Thus, it is possible to obtain a region to which the IO concentration will move in the near future based on a transition speed and growth time of the region and to move the IOs to the SSD 20 before the IO concentration occurs by focusing attention to the fact that the region in which the number of IOs increases (the IOs concentrate) moves (transits) with time in the predicted moving control. Hereinafter, the IO concentration will be referred to as access concentration in some cases.

At this time, there is a possibility that user IO responses deteriorate if the moving based on the IO analysis and the moving based on the predicted moving control are performed at the same time. Thus, it is possible to avoid the deterioration of the IO responses by performing the predicted moving control at timing when the moving based on the IO analysis is not performed.

As described above, the predicted moving is a function of predicting which of segments (sub_LUN) the region on which access currently concentrates will transit in a very near future and moving data in the predicted transition destination segment from the HDD 30 to the SSD 20 before the segment is brought into the access concentration state. By the function, the moving of the data in the predicted transition destination segment to the SSD 20 is completed before accesses concentrate on the transition destination segment. Therefore, substantially no deterioration of the IO access performance due to the moving of the segment occurs, and an IO access to the transition destination segment is hit in the SSD 20 from the initial stage of the occurrence. Therefore, it is possible to expect significant enhancement in the performance by the predicted moving.

Figure 7:
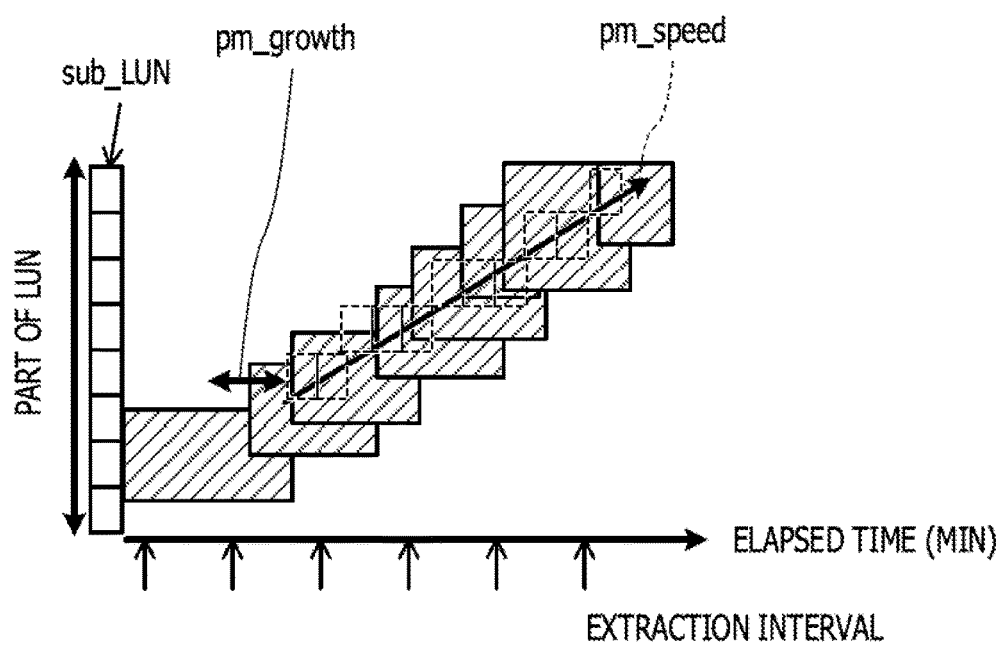
FIG. 7 is an explanatory diagram of an example of workload analysis, a transition speed, and growing time.

In the embodiment, the prediction of the segment (sub_LUN) as the transition destination is performed by using a transition speed (pm_speed) of the region on which the accesses will concentrate and growth time (pm_growth) until the access concentration state is achieved from a state where the number of IOs to the region per unit time is equal to or less than the predetermined value as illustrated in FIG. 7. Therefore, the transition speed pm_speed and the growth time pm_growth are parameters used for predicting the IO concentration region (transition destination segment). FIG. 7 is an explanatory diagram of the transition speed pm_speed and the growth time pm_growth by enlarging main components in the analysis example of the workload illustrated in FIG. 6.

At this time, the data collecting unit 11*a* calculates and counts the number of accesses (the number of IOs) to each segment corresponding to the access concentration region at a specific time interval (extraction interval) and stores the number of accesses counted for each segment along with a timestamp in the IODB 11*b*.

The workload analysis unit 11*c* (transition speed calculation unit 11*h*) extracts the segment where the number of IOs is the largest in a segment group (sub_LUN group) forming the access concentration region. Then, the workload analysis unit 11*c* (transition speed calculation unit 11*h*) calculates the transition speed pm_speed based on a difference of elapsed time and a transition distance (moving distance: a difference between segment IDs) for the segment extracted at each extraction interval (see FIG. 7).

The workload analysis unit 11*c* (growth time calculation unit 11*i*) refers to the number of IOs in the past (the access log in the past; a history of the access log) for the segment, in which the number of IOs is the largest, which is extracted at specific timing. In doing so, the workload analysis unit 11*c* (growth time calculation unit 11*i*) calculates, as the growth time pm_growth, the time until the segment is brought into the state where the number of the IOs becomes the largest in the segment group from the state where the number of IOs to the segment per unit time is equal to or less than the predetermined value (see FIG. 7).

The workload analysis unit 11*c* updates the transition speed pm_speed and the growth time pm_growth registered and set in the memory, for example, which is not illustrated in the drawing, as described above to a transition speed pm_speed and growth time pm_growth calculated in association with the detection of the access concentration region, respectively.

Figure 8:
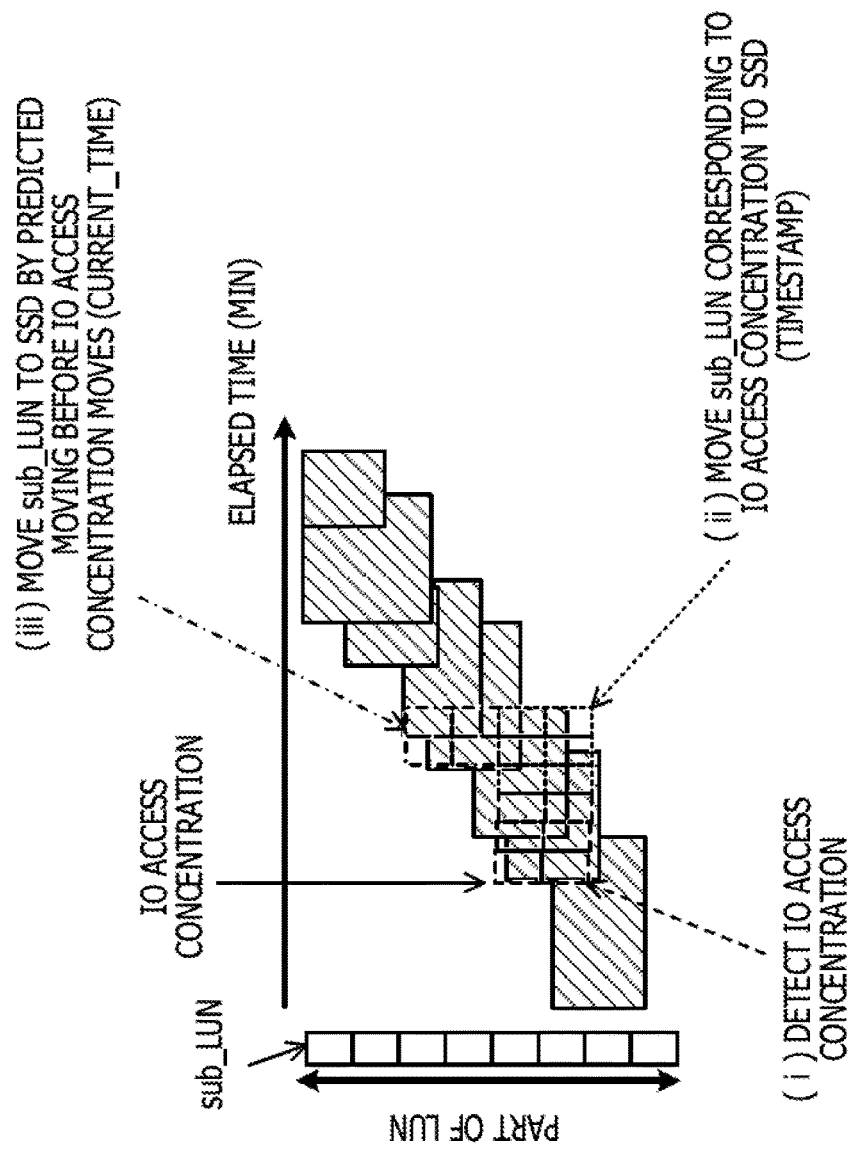
FIG. 8 is an explanatory diagram of an example of workload analysis and an example of a processing procedure for a predicted moving control.

Next, description will be given of an example of a processing procedure for the predicted moving control performed by the moving control unit 11*e* with reference to FIGS. 8 and 9. FIG. 8 is an explanatory diagram of an example of a processing procedure for the predicted moving control for the analysis example of the workload illustrated in FIG. 7. FIG. 9 is an explanatory diagram of an example of a processing procedure for the predicted moving control performed by the moving control unit.

The workload analysis unit 11*c* detects IO access concentration (see (i) in FIG. 8), then extracts the segment on which the IO accesses concentrate, and provides a request for moving the extracted segment to the SSD 20 to the moving instruction unit 11*d*. Correspondingly, the data in the segment corresponding to the IO access concentration is moved to the SSD 20 at first timing (see (ii) in FIG. 8 and the upper section in FIG. 9). At this time, the moving control unit lie receives a segment ID of the extracted segment from the workload analysis unit 11*c* as illustrated in (i) in FIG. 9. Then, the moving control unit 11*e* can store and save the received segment ID along with current clock time (timestamp; corresponding to clock time when the moving to the SSD 20 is performed) in the prediction segment DB 11*f* (see FIG. 1).

Figure 9:
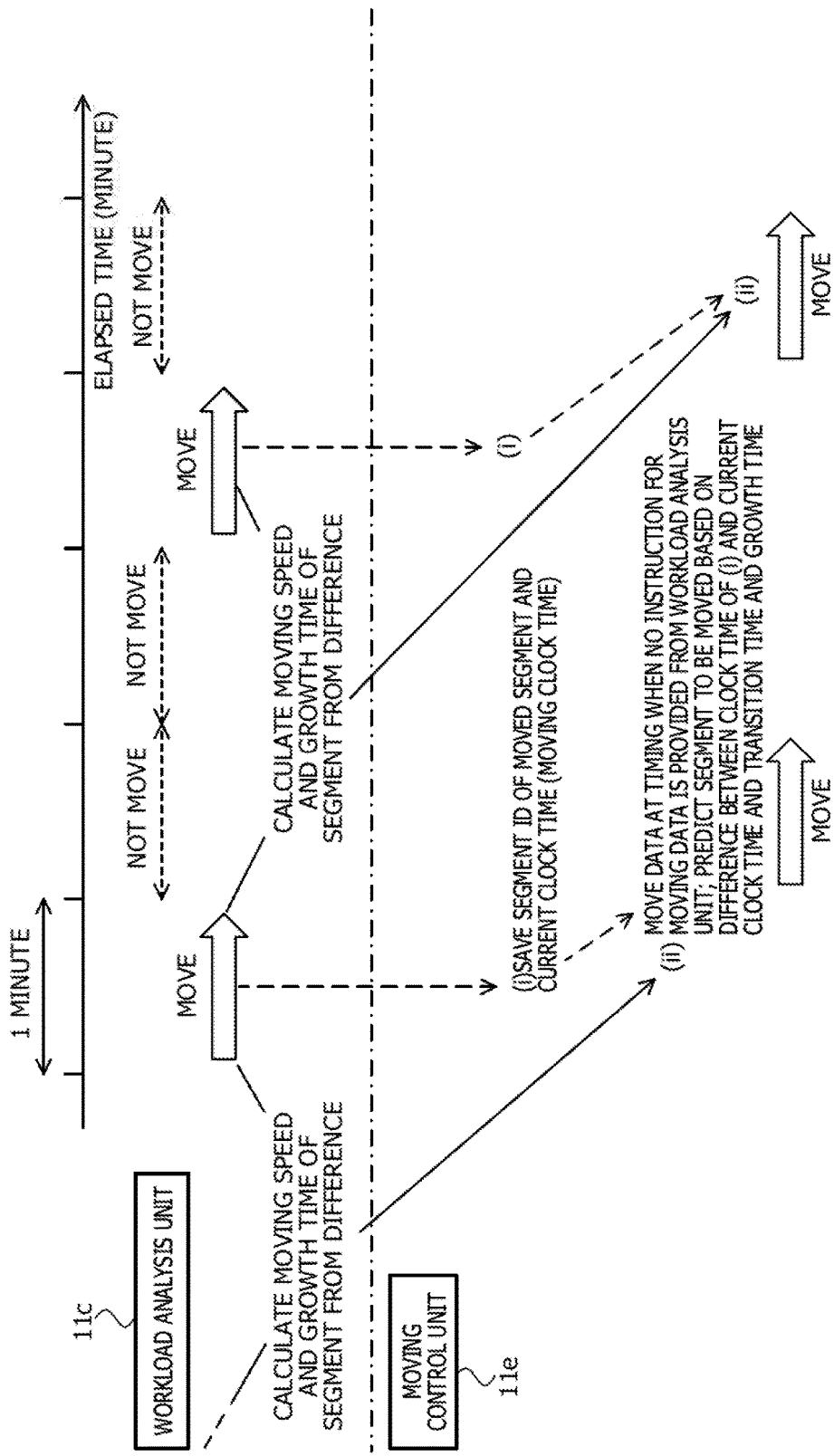
FIG. 9 is an explanatory diagram of an example of the processing procedure for the predicted moving control performed by the moving control unit.

The processing of (i) in FIG. 9 may be triggered by reception of the information (the segment ID (sub_LUN_ID)) of the selected (indicated) segment as the moving target from the HDD 30 to the SSD 20 by the IO analysis from the workload analysis unit 11*c*. At this time, the moving control unit 11*e* saves the segment ID of the segment indicated by the workload analysis unit 11*c* along with the current clock time in the prediction segment DB 11*f*.

The prediction segment DB 11*f* stores information related to the segment designated by the workload analysis unit 11*c* and is realized by a memory, for example, which is not illustrated in FIG. 9.

An example of the data structure in the prediction segment DB 11f will be illustrated in FIG. 10. The prediction segment DB 11f can store the information specifying the segment and the timestamp in an illustrative example. The information specifying the segment may be a segment ID in the same manner as in the IODB 11b or a head offset of the segment or the like. The timestamp is an identifier identifying clock time, and clock time itself is set, for example. In one example, "xxxxxx . . . x" is set as clock time (timestamp) when a segment "10" is predicted in the prediction segment DB 11f.

As illustrated in (ii) in FIG. 9, the moving control unit 11e can provide an instruction for moving the segment to the moving instruction unit 11d at timing when no instruction for moving the segment is provided by the workload analysis unit 11c (second timing that is different from the aforementioned first timing) in the predicted moving control (see (iii) in FIG. 8).

In the processing of (ii) in FIG. 9, the moving control unit 11e extracts the information of the segment, namely sub_LUN_ID and the timestamp from the prediction segment DB 11f. Then, the moving control unit 11e can predict the segment ID of the transition destination segment based on the current time current_time, the transition speed pm_speed, and the growth time pm_growth and then issue an instruction for moving the predicted transition destination segment.

Here, the segment ID (a numerical value new_sub_LUN_ID of the identification information of the transition destination unit region) of the transition destination segment is calculated, predicted, and determined by the following Equation (1).

new_sub_LUN_ID=sub_LUN_ID+((current_time−timestamp)+pm_growth)*pm_speed    Equation (1)

The moving control unit 11e can calculate sub_LUN_ID before IO concentration occurs by adding the growth time pm_growth to a difference between the timestamp of the clock time when sub_LUN_ID is saved and the current time current_time by using the aforementioned Equation (1).

Thereafter, the moving processing unit 12d executes the moving of the transition destination segment to the SSD 20 by the moving control unit 11e providing, to the moving instruction unit 11d, a request for moving the predicted transition destination segment to the SSD 20 at the second timing when no instruction for moving the segment is provided by the workload analysis unit 11c. Correspondingly, the data in the transition destination segment is moved to the SSD 20 at the second timing (see (iii) in FIG. 8 and the lower section in FIG. 9).

As described above, the moving instruction unit 11d and the moving processing unit 12d that operates in response to the instruction for moving the segment from the moving instruction unit 11d are examples of the following moving unit. The moving unit moves the data in the segment as a moving target determined by the IO analysis performed by the workload analysis unit 11c from the HDD 30 to the SSD 20 at the first timing. In contrast, the moving unit moves the data in the transition destination segment predicted by the moving control unit 11e from the HDD 30 to the SSD 20 at the second timing that is different from the first timing.

As described above, the moving control unit 11e can reflect the segment that has advanced (moved) from the clock time when the processing of (i) in FIG. 9 was performed to the current clock time to the segment ID extracted from the prediction segment DB 11f, for example. Furthermore, the moving control unit 11e can reliably complete the moving of the data in the transition destination segment to the SSD 20 before the access concentration occurs in the transition destination segment by calculating and using the growth time pm_growth. Therefore, the IO access to the transition destination segment is hit in the SSD 20 from the initial stage of the occurrence with substantially no deterioration of the IO access performance that accompanies the moving of the segment.

According to the embodiment, the workload analysis unit 11c can independently set the transition speed pm_speed and the growth time pm_growth, which are parameters used for predicting the IO concentration region, based on the access log at a specific time interval. In doing so, it is possible not only to release an operator to set parameters but also to precisely predict and track the transiting IO concentration region. Correspondingly, it is possible to appropriately move the data in the IO concentration region to the SSD before the IO concentration occurs and to realize enhancement in the performance by the predicted moving.

Incidentally, there is a possibility that a user IO response deteriorates if the moving based on the IO analysis and the moving based on the predicted moving control are performed at the same time. The workload analysis unit 11c selects a segment that moves at a predetermined cycle, such as an interval of one minute, as described above. However, in a case where no change occurs in the segment on which the IOs concentrate from a previous cycle, no transiting segment may be selected as the cycle represented by the arrow of the broken line labeled as "no moving" in the processing performed by the workload analysis unit 11c in FIG. 9.

Thus, the moving control unit 11e can perform the processing of (ii) in FIG. 9 at a cycle at which no instruction for moving the segment is provided from the workload analysis unit 11c (the segment information is not provided or the information indicating that no segment has been selected is provided).

According to the predicted moving control performed by the moving control unit 11e, it is possible to move the segment on which the IOs are expected to concentrate in the near future to the SSD 20 with a satisfactory performance from the HDD 30 in advance as described above. Therefore, it is possible to suppress the deterioration of the user IO response during the moving of the segment from the HDD 30 to the SSD 20.

[1-4] Description of Observation Moving Control

Next, description will be given of the observation moving control with reference to FIGS. 11 to 14.

According to the observation moving control, it is possible to suppress deterioration of the user IO response during the moving of the segment from the SSD 20 to the HDD 30 in an opposite manner to the predicted moving control.

In dynamic hierarchical moving, a segment is used as a minimum unit of the moving as described above. Since the segment is a relatively large unit of about 1 GB, there is a possibility that a large amount of user IO responses deteriorate if the hierarchical moving is executed when a large load is applied on the HDD 30.

Thus, observation moving of a sufficiently smaller size (hereinafter, described as an observation moving size) than the segment size is executed between vacant regions in the SSD 20 and the HDD 30, and if the user IO response at that time does not deteriorate, then the original (indicated) hierarchical moving can be subsequently executed in the observation moving control.

In a case where the segment size is 1 GB, the observation moving size can be equal to or less than 200 MB (⅕ of the segment size), for example, or preferably about 50 MB (1/20 of the segment size).

However, in a case where the observation moving size is excessively small, there is a possibility that the moving is completed before a load on the HDD 30 is caused and the user IO response is not correctly observed. Therefore, the observation moving size is preferably determined within a range in which the load on the HDD 30 is caused and the user IO responses of the entire hierarchical storage system 1 are not significantly affected.

Description will be given of an example of a processing procedure for the observation moving control performed by the moving control unit 11e and the observation processing unit 12e with reference to FIG. 11. As illustrated in (I) in FIG. 11, the moving control unit 11e can provide an instruction for performing the observation moving to the hierarchical driver 12 (observation processing unit 12e) before moving the segment from the SSD 20 to the HDD 30 in the observation moving control (see (1) in FIG. 14).

Figure 11:
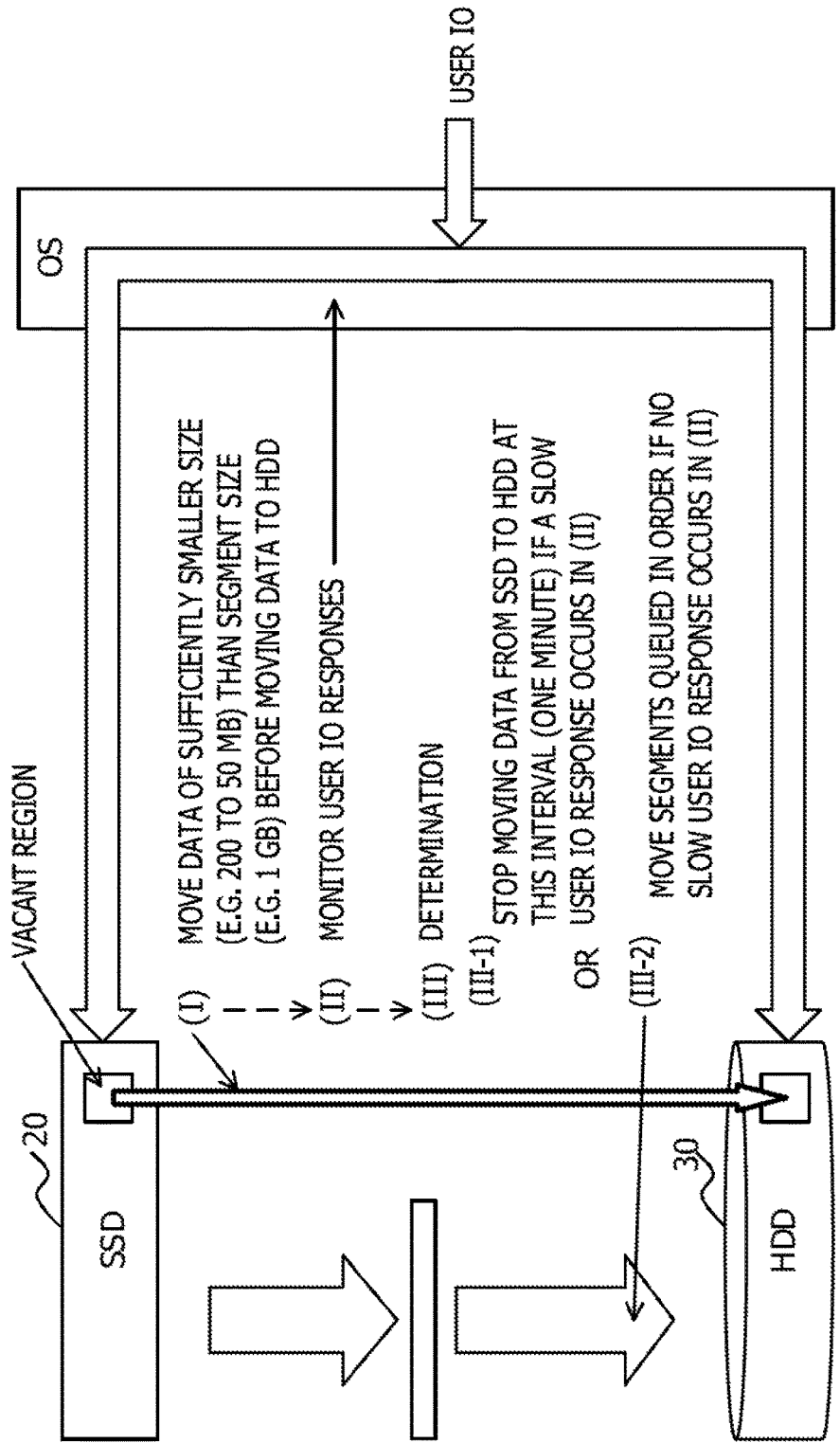
FIG. 11 is an explanatory diagram of an example of a processing procedure for an observation moving control performed by the moving control unit and an observation processing unit.

The processing of (I) in FIG. 11 may be triggered by reception of the information (the segment ID, for example) of the segment selected (indicated) as a target of the moving from the SSD 20 to the HDD 30 by the IO analysis from the workload analysis unit 11c. At this time, the moving control unit 11e can store the information of the segment indicated by the workload analysis unit 11c in the moving queue 11g (see FIG. 1).

The moving queue 11g is a storage region with an FIFO structure that temporarily stores the information of the segment indicated as the target of the moving from the SSD 20 to the HDD 30 by the workload analysis unit 11c and is realized by a memory, for example, which is not illustrated in FIG. 11. The timing of the hierarchical moving can be adjusted by the moving queue 11g queuing the information of the segment related to the hierarchical moving.

In one example, the moving control unit 11e receives the information of segments to be moved to the HDD 30 from the workload analysis unit 11c the stores the information of the segments in the moving queue 11g in an order of the reception. In addition, the moving control unit 11e provides an instruction for performing the observation moving to the hierarchical driver 12 in a case where even one information item of a segment is stored in the moving queue 11g.

Figure 14:
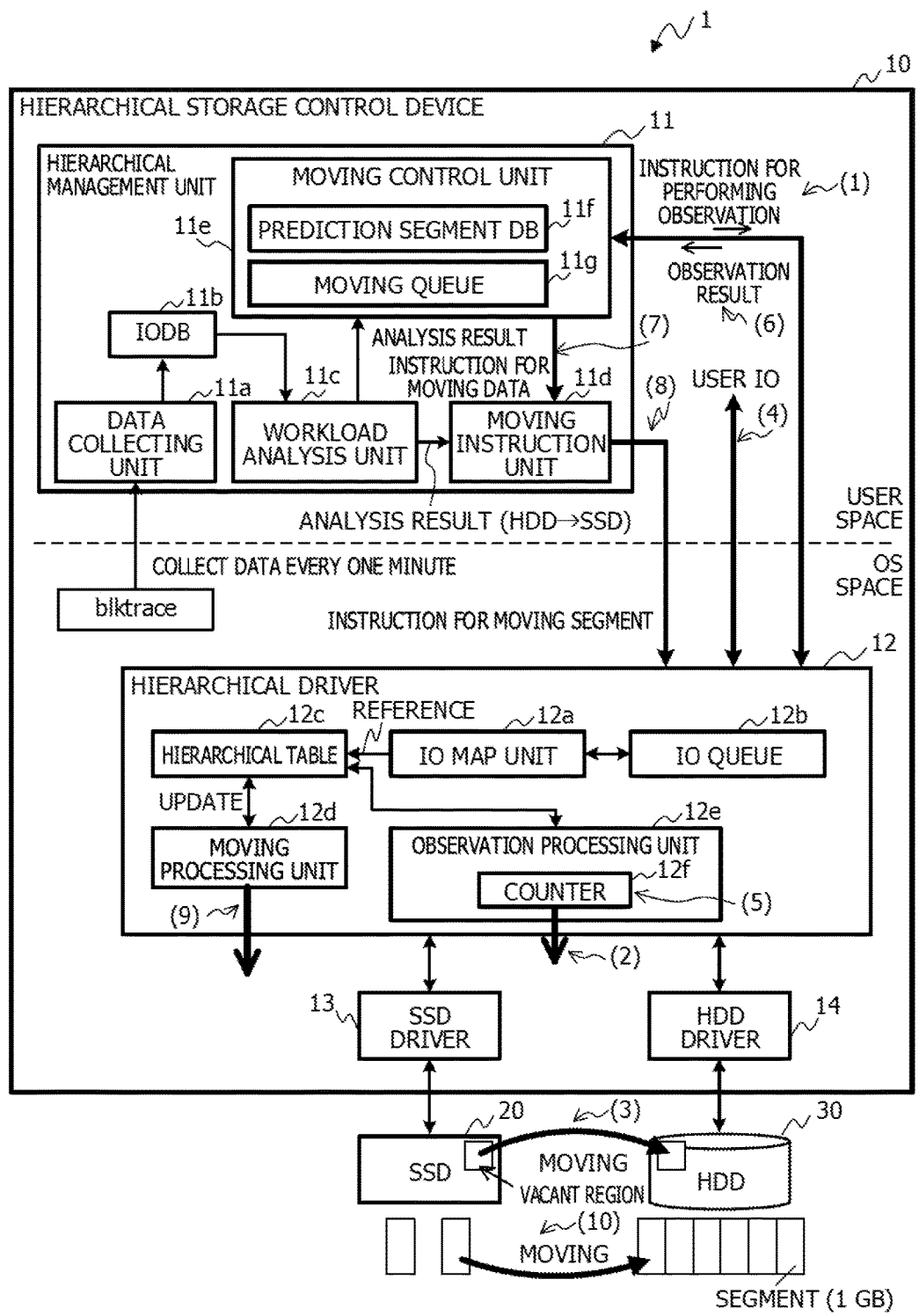
FIG. 14 is an explanatory diagram of an example of a processing procedure for the observation moving control performed by the moving control unit and the observation processing unit.

The hierarchical driver 12 (observation processing unit 12e) can provide, to kcopyd, an instruction for performing the observation moving between vacant regions from the SSD 20 to the HDD 30 in response to the instruction for performing the observation moving from the moving control unit 11e (see (2) in FIG. 14) and cause kcopyd to perform the observation moving (see (3) in FIG. 14). The observation processing unit 12e may select, as the observation moving size, a partial region in the segment as the target of the moving in a case of receiving the information of the segment as the target of the moving based on the IO analysis along with the instruction for moving the segment. The region where the observation moving is performed is not limited to the aforementioned region, and an arbitrary region may be selected.

The observation processing unit 12e can include a counter 12f for observing information related to a user IO response performance (see FIG. 1). The counter 12f can count the number of times the response time to the user IOs exceeds a predetermined threshold value during the moving of the data of the observation moving size.

For example, the observation processing unit 12e moves data of the observation moving size in response to the instruction for performing observation from the moving control unit 11e. The observation processing unit 12e measures the response time to the user IOs for a predetermined period such as several seconds to several tens of seconds as illustrated in (II) in FIG. 11 (see (4) in FIG. 14) and counts the number of times the response time exceeds the predetermined threshold value by the counter 12f (see (5) in FIG. 14). If the predetermined period is completed, the observation processing unit 12e can provide information about the count value of the counter 12f to the moving control unit 11e (see (6) in FIG. 14). The observation moving of the selected region may be repeatedly performed for a predetermined period.

Several tens of ms to several hundreds of ms, such as 300 milliseconds (ms) in one example, is exemplified as the predetermined threshold value.

The moving control unit 11e receives the count value from the observation processing unit 12e after elapse of a predetermined period from the issue of the instruction for performing the observation, and can then determine whether or not the hierarchical moving of the segment size can be executed based on the received count value as illustrated in (III) in FIG. 11.

In a case where the received count value is a value that does not indicate deterioration of the response, such as 0 in one example, the moving control unit 11e can determine to perform the hierarchical moving processing of the segment size since no user IO with slow response occurs (see (III-2) in FIG. 11). In contrast, in a case where the received count value is a value that indicates deterioration of the response, such as a value that is greater than 0 in one example, the moving control unit 11e can determine not to perform the hierarchical moving processing of the segment size at a current interval (cycle) since a user IO with slow response occurs (see (III-1) in FIG. 11).

The moving control unit 11e can extract the segment information stored in the moving queue 11g, sequentially provides the information to the moving instruction unit 11d, and provides an instruction for performing the hierarchical moving in a case of determining to perform the hierarchical moving processing (see (7) in FIG. 14). The moving instruction unit 11d receives the instruction, then provides the instruction for performing the hierarchical moving to the hierarchical driver 12 as described above (see (8) in FIG. 14), the moving processing unit 12d provides an instruction for transferring data to kcopyd, for example (see (9) in FIG. 14), and the hierarchical moving is performed (see (10) in FIG. 14).

In contrast, the moving control unit 11e can wait for the next cycle without extracting the segment information stored in the moving queue 11g (while stopping the hierarchical moving) in a case of determining not to perform the hierarchical moving processing.

As described above, the moving control unit 11e receives, from the workload analysis unit 11c, the instruction for performing the hierarchical moving from the SSD 20 to the HDD 30, and can then queue the segment information related to the hierarchical moving and cause the observation processing unit 12e to execute the moving of data with the sufficiently smaller size than the segment size to the vacant region. Then, the moving control unit 11e can stop the hierarchical moving in a case where the deterioration of the user IOs is observed, and can provide an instruction for moving the segment designated by the IO analysis in a case where no deterioration of the user IOs is observed.

Therefore, it is possible to detect the load status of the HDD 30 in real time, to determine whether or not it is possible to perform the hierarchical moving from the SSD 20 to the HDD 30, perform the hierarchical moving at timing when the user IO responses are not affected, and to thereby suppress the deterioration of the user IO responses.

It is possible to easily achieve an idea that optimal values for the aforementioned observation moving size and the predetermined threshold value of the counter 12f vary depending on devices (the SSD 20, the HDD 30, a bus, and other devices, for example) used in the hierarchical storage system 1 and the workload. Although the observation moving size is set to 50 MB with respect to the segment size of 1 GB and the threshold value of the counter 12f is set to 300 ms in a configuration in one embodiment, these parameters may be appropriately changed in accordance with conditions of the devices used, for example.

FIG. 12 is a diagram (table) of an example illustrating, for each predetermined threshold value, an example of a relationship between a consumption amount (GB) of SSD 20 and an average response time (ms) in dynamic hierarchical control (including predicted moving control and observation moving control) in one embodiment. FIG. 12 illustrates an evaluation result for FACEBOOK (registered trademark) FlashCache that mounts an SSD as a write-back cache in addition to an HDD as a comparative example.

For the evaluation illustrated in FIG. 12, a system with the following configuration is used.

PC . . . CPU (Central Processing Unit): Intel (registered trademark), Xeon (registered trademark), E5-2650L×2, memory: 32 GB, OS: Cent-OS 5.4 (64 bit)

HDD 30 . . . compatible with SAS (Serial Attached SCSI (Small Computer Storage Interface)), 10,000 rpm, 450 GB×4, RAID0 configuration

SSD 20 . . . 240 GB

Furthermore, a read/write ratio of a target workload is 56:44, and workload capacity is 293 GB.

In FIG. 12, the "SSD consumption amount" is the maximum consumption amount of the SSD 20 allocated by using the predicted moving control and the observation moving control, and the same value is set for FlashCache. The "user IO threshold value" is a predetermined threshold value for the observation moving control.

As illustrated in FIG. 12, It is possible to recognize that if the SSD consumption amount is equal to or greater than 75 GB, the average response time in the predicted moving control and the observation moving control becomes shorter than that of FlashCache, and in a case where the SSD consumption amount is 99 GB, in particular, the average response time in the predicted moving control and the observation moving control becomes shorter than that of FlashCache by 45.9%.

Figure 13:
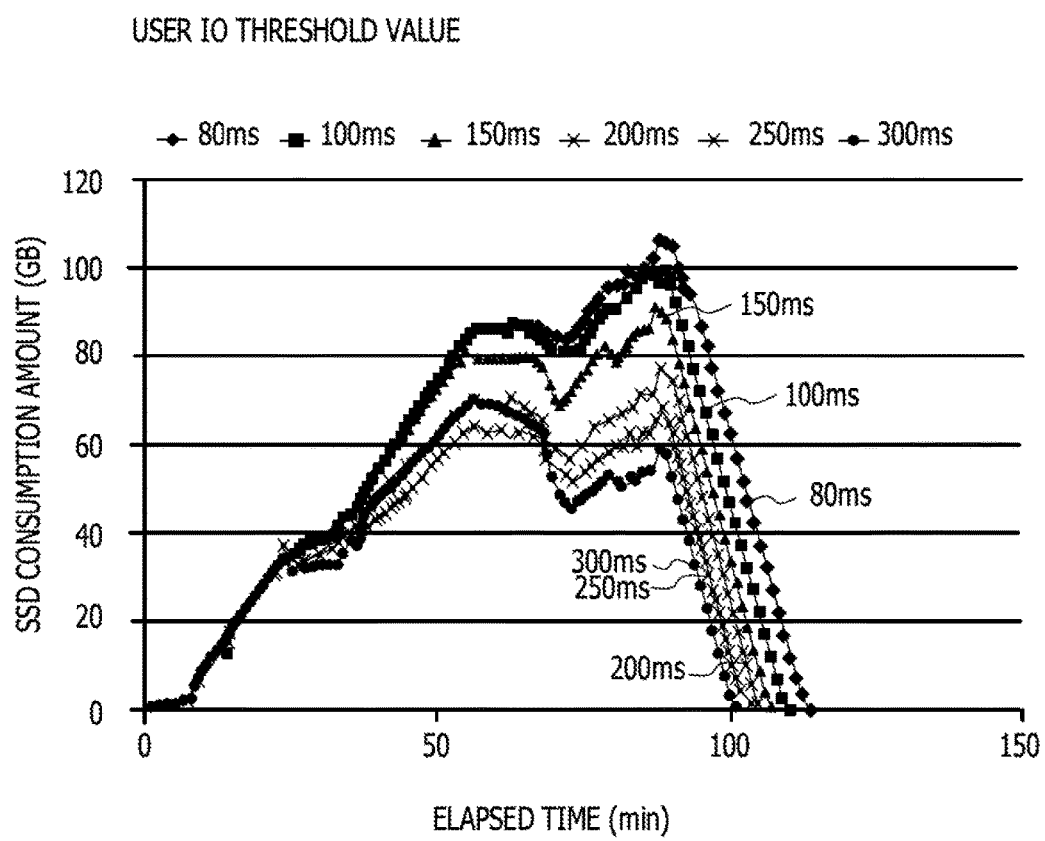
FIG. 13 is a diagram illustrating an example of a consumption amount of the SSD in a workload illustrated in FIG. 12.

FIG. 13 is an example illustrating an example of the SSD consumption amount under the workload illustrated in FIG. 12. As illustrated in FIG. 13, it is possible to recognize that the SSD consumption amount decreases to zero in about twenty minutes if the user IO responses fall below the predetermined threshold value in a case where the predicted moving control and the observation moving control are performed by the moving control unit 11e. It is also possible to recognize in FIG. 13 that the use amount of the SSD 20 decreases and the time until the use amount reaches zero becomes shorter as the predetermined threshold value increases.

It is possible to recognize from the evaluation results illustrated in FIGS. 12 and 13 that the SSD consumption amount increases while the response time becomes shorter as the predetermined threshold value decreases and that the SSD consumption amount decreases while the response time becomes longer as the predetermined threshold value increases.

Therefore, the predetermined threshold value is preferably set in consideration of the tradeoff relationship between the capacity of the SSD 20 and the desired response time. Therefore, the hierarchical management unit 11 and the hierarchical driver 12 may have a function of adjusting the parameters, such as the observation moving size and the predetermined threshold value for the counter 12f, to optimal values.

It is possible to recognize that the hierarchical storage system 1 in the embodiment can enhance the average user IO response by about 40% as compared with that of FlashCache that mounts caching thereon as described above.

[1-5] Operation Example of Hierarchical Storage System

Next, description will be given of an operation example of the hierarchical storage system 1 configured as described above with reference to FIGS. 15 to 29.

First, description will be given of operation examples of data collection processing performed by the data collecting unit 11a and parameter update processing performed by the workload analysis unit 11c with reference to FIG. 15. The data collecting unit 11a is activated under a condition that the data collecting unit 11a executes a blktrace command for predetermined time (sixty seconds, for example) and then completes the blktrace command, and executes the data collection processing.

Figure 15:
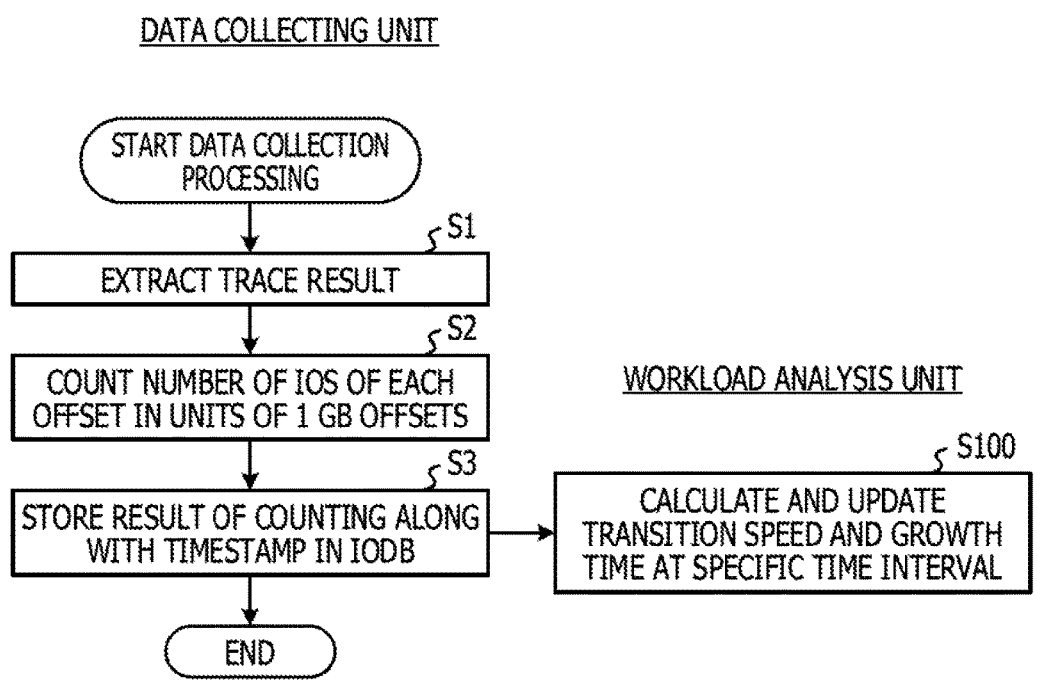
FIG. 15 is an explanatory flowchart of an operation example of data collection processing performed by a data collecting unit and parameter update processing performed by a workload analysis unit.

As illustrated in FIG. 15, the data collecting unit 11a extracts a trace result obtained by executing the blktrace command (Step S1). Then, the data collecting unit 11a counts the number of IOs in each segment in units of 1 GB offset (segment units) (Step S2), writes the number of IOs along with the timestamp in the IODB 11b (Step S3), and completes the processing of this interval.

As described above, the data collecting unit 11a can feedback an influence of a fluidly changing workload on the user IOs to the workload analysis unit 11c by periodically monitoring the number of IOs for each segment.

At this time, the workload analysis unit 11c calculates the latest transition speed pm_speed and the growth time pm_growth every time the number of IOs for each segment is counted at the specific time interval (extraction interval) and is stored as access log in the IODB 11b. That is, the workload analysis unit 11c calculates and updates the latest transition speed pm_speed and the growth time pm_growth as follows based on the access log in the past including the number of IOs stored in the IODB 11b this time (Step S100).

Here, description will be given of a method of calculating the transition speed pm_speed first with reference to FIGS. 16 to 18.

The aforementioned segment ID (sub_LUN ID) is allocated to each segment as identification information for specifying each segment. The segment ID is an ascending or descending numerical value that varies in accordance with an arrangement order of the segment.

Figure 18:
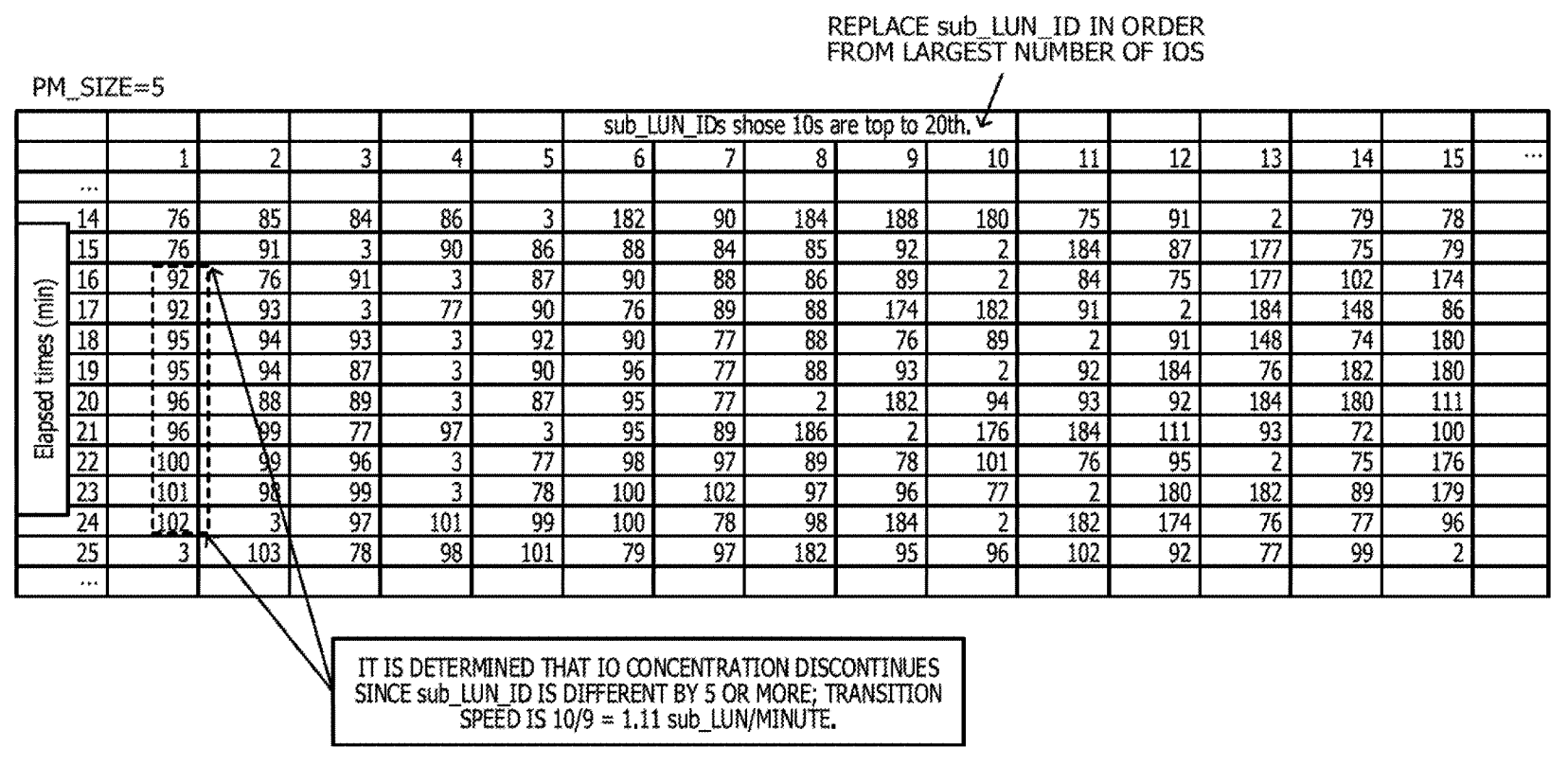

The transition speed calculation unit 11h of the workload analysis unit 11c extracts the segment ID (the identification information of the unit region) of the segment with the maximum access number from among the plurality of segments at predetermined timing from the access log of the IODB 11b (see FIG. 18). In the example illustrated in FIG. 16, a segment ID of a segment with the maximum number of IOs in one minute from clock time t to clock time t+1 is represented as top sub_LUN at the time t, and a segment ID of a segment with the maximum number of IOs in one minute from the clock time t+1 to clock time t+2 is represented as top sub_LUN at the clock time t+1.

The transition speed calculation unit 11h extracts a group (sub_LUN group: segment group) including numerical values of such two or more continuous segment IDs that a difference between the numerical values of the two adjacent segment IDs is within a predetermined range PM_SIZE (5, for example) from among the numerical values of the segment IDs extracted at the predetermined timing. In a case where such a group is extracted, the transition speed calculation unit 11h calculates the transition speed pm_speed as follows. That is, the transition speed calculation unit 11h calculates the transition speed pm_speed by dividing a difference between a numerical value of a segment ID at an end point of the group and a numerical value of a segment ID at a start point of the group by elapsed time from the start point to the end point of the group (see FIG. 17).

Figure 16:
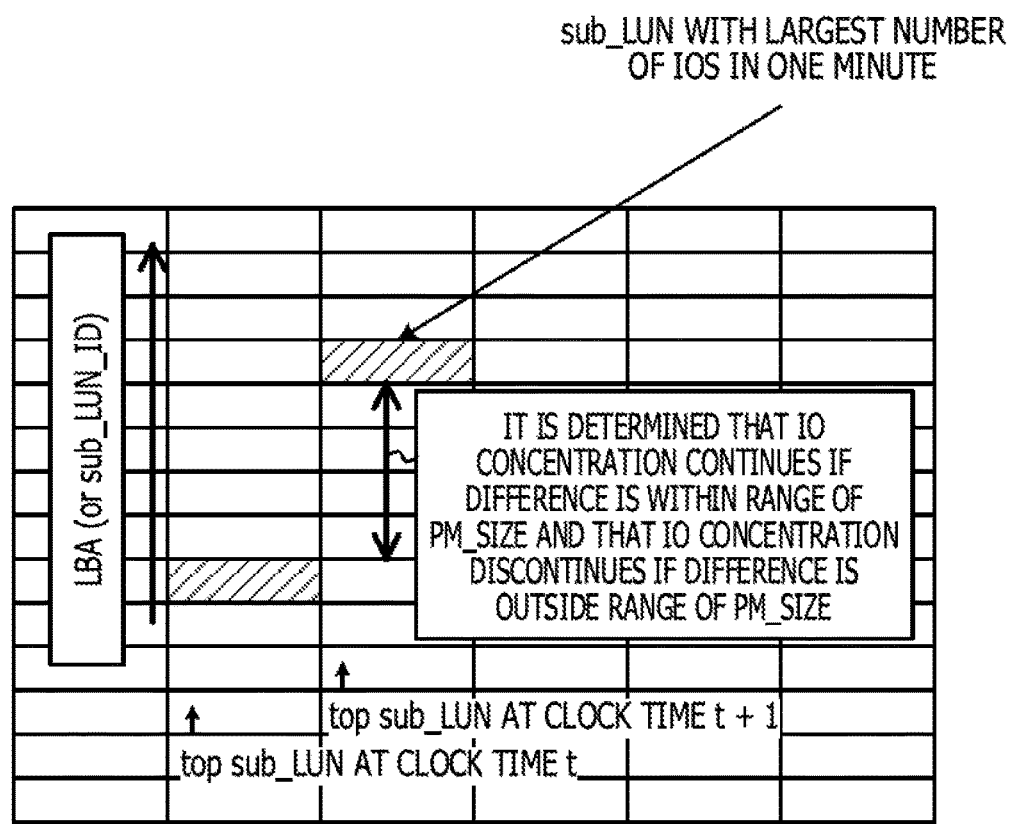
FIG. 16 is an explanatory diagram of a transition speed calculation method performed by a transition speed calculation unit.

As illustrated in FIG. 16, for example, the transition speed calculation unit 11h determines that IO access concentration has continued between two adjacent segments if the difference between the numerical values of the two adjacent segment IDs is within the predetermined range PM_SIZE (5, for example). In contrast, if the difference between the numerical values of the two adjacent segment IDs is outside the predetermined range PM_SIZE, the transition speed calculation unit 11h determines that the IO access concentration has discontinued between the two adjacent segments.

Figure 17:
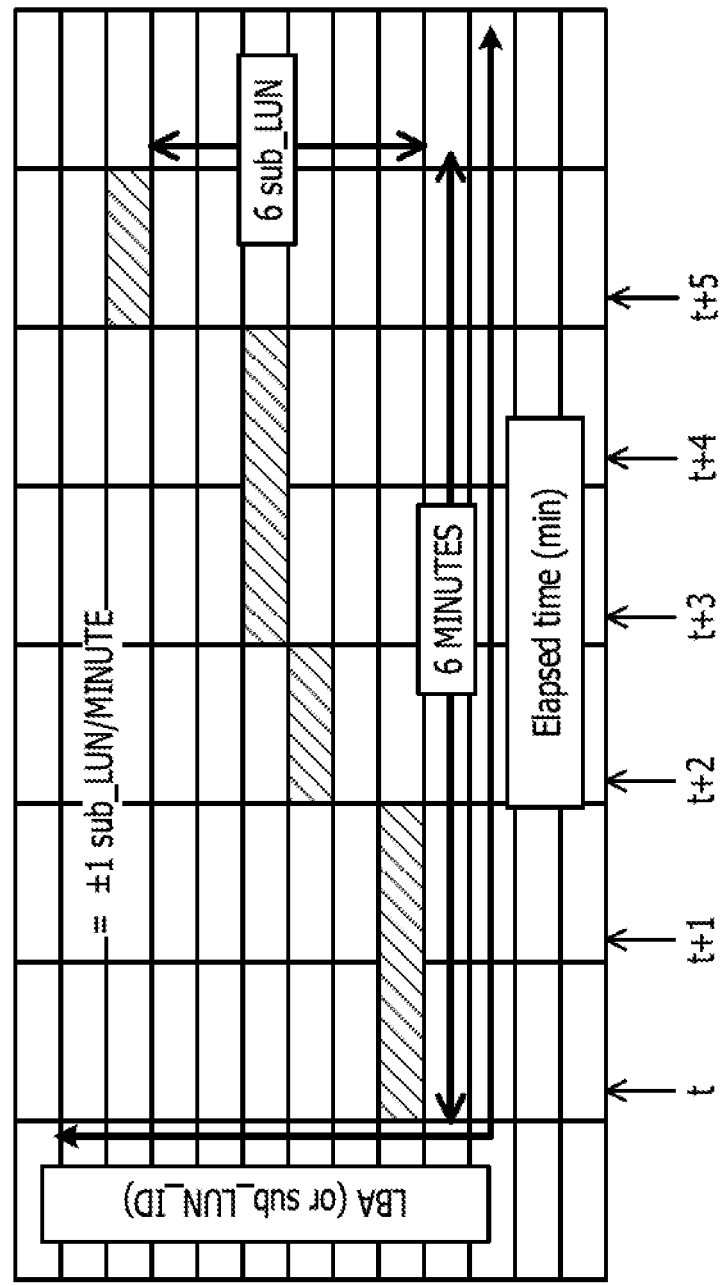
FIG. 17 is an explanatory diagram of the transition speed calculation method performed by the transition speed calculation unit.

In a case where the IO access concentration has continued for elapsed time of 6 minutes (Elapsed times (min)) from the clock time t to clock time t+5 and the numerical value of sub_LUN_ID increases by six in the elapsed time (6 sub_LUN) as illustrated in FIG. 17, for example, the transition speed calculation unit 11h calculates 6 sub_lun/6 (minutes)= +1 sub_LUN/minute as the transition speed pm_speed. In a case where the numerical value of sub_LUN_ID decreases by 6 in the elapsed time of 6 minutes, −1 sub_LUN/minute is calculated as the transition speed pm_speed.

The workload analysis unit 11c refers to the access log in the past including the latest information prior to the calculation of the latest transition speed pm_speed and the growth time pm_growth and extracts n higher-order segment IDs (sub_LUN_ID) of the segments with the largest numbers of IOs as illustrated in FIG. 18, for example. In the example illustrated in FIG. 18, twenty higher-order segment IDs (sub_LUN_ID) of the segments with the largest numbers of IOs at clock time 14 to clock time 25 are rearranged and illustrated in an order from the largest number of IOs. FIG. 18 illustrates fifteen higher-order segment IDs (sub_LUN_ID) due to restriction of the space on the paper.

Since the difference of two adjacent top sub_LUN_IDs 92−76=16 exceeds PM_SIZE=5 between the clock time 15 and the clock time 16 in a case of calculating the transition speed pm_speed in the example illustrated in FIG. 18, the transition speed calculation unit 11h determines that the IO access concentration discontinues between the clock time 15 and the clock time 16.

Since all the differences between the two adjacent top sub_LUN_IDs in the range from the clock time 16 to the clock time 24 are within PM_SIZE=5, the transition speed calculation unit 11h determines that the IO access concentration continues from the clock time 16 to the clock time 24.

Since the difference between the two adjacent top sub_LUN_IDs 102−3=99 exceeds PM_SIZE=5 between the clock time 24 and the clock time 25, the transition speed calculation unit 11h determines that the IO access concentration discontinues between the clock time 24 and the clock time 25.

At this time, the difference between the numerical value 102 of the segment ID at the end point and the numerical value 92 of the segment ID at the start point of the group is 10. Correspondingly, the transition speed calculation unit 11h calculates 10/9=1.11 sub_LUN/minute as the transition speed pm_speed.

Next, description will be given of a method of calculating the growth time pm_growth with reference to FIG. 19.

The growth time calculation unit 11i of the workload analysis unit 11c extracts the segment IDs (sub_LUN_ID) of all the segments and the numbers of the IOs in an order from the largest number of IOs from the access log in the IODB 11b at predetermined timing at a specific time interval.

The growth time calculation unit 11i the latest segment ID and the number of IOs of the segment with the largest number of IOs from the access log at the latest predetermined timing. The growth time calculation unit 11i obtains the oldest predetermined timing when the number of IOs of the segment with the latest segment ID exceeds a predetermined value (20, for example) at timing before the latest predetermined timing by referring to the segment IDs and the numbers of IOs of all the segments extracted at the predetermined timing. The growth time calculation unit 11i calculates the growth time pm_growth based on difference time between the latest predetermined timing and the oldest predetermined timing.

For example, n higher-order segment IDs (sub_LUN_ID) of the segments with the largest numbers of IOs are extracted as illustrated in FIG. 19 at the timing when the latest predetermined timing is the time clock 20, for example. In the example illustrated in FIG. 19, twenty higher-order segment IDs (sub_LUN_ID) of the segments with the largest numbers of IOs at the clock time 18 to clock time 20 are rearranged and illustrated in an order from the largest number of IOs. FIG. 19 illustrates fifteen higher-order segment IDs (sub_LUN_ID) due to restriction of the space on the paper.

At this time, the growth time calculation unit 11i extracts the latest segment ID "96" of the segment with the largest number of IOs at the clock time 20 corresponding to the latest predetermined timing. In addition, the growth time calculation unit 11i refers to the twenty higher-order segment IDs extracted at the clock time 19 and the clock time 18 as predetermine timing in the past. In doing so, the oldest predetermined timing when the latest segment ID "96" appeared is obtained at the timing before the latest predetermined timing (clock time 20).

In the example illustrated in FIG. 19, it is assumed that the latest segment ID "96" appears around 6 at the clock time 19 and the number of IOs in the segment with the latest segment ID "96" exceeds the predetermined value 20. However, it is assumed that the number of IOs in the segment with the latest segment ID "96" at the clock time 18 is equal to or less than the predetermined value 20. In such a case, the oldest predetermined timing when the number of IOs in the segment with the latest segment ID "96" exceeds the predetermined value 20 is the clock time 19, and the number of IOs exceeds the predetermined value 20 one minute before the number of IOs in the segment with the latest segment ID "96" reaches the maximum value. Therefore, a value of 2 minutes is calculated by adding one minutes to one minutes as difference time between the latest predetermined timing and the oldest predetermined timing as the growth time pm_growth.

As described above, the growth time calculation unit 11i can grasp, as the growth time pm_growth, how many minutes has passed since the number of IOs in the segment with the segment ID started to increase by tracking a history of the segment ID of the largest number of IOs as illustrated in FIG. 19. Then, it is possible to reliably complete the moving of the data in the transition destination segment to the SSD 20 before the access concentration occurs in the transition destination segment by reflecting the growth time pm_growth to the prediction of the transition destination segment.

Figure 20:
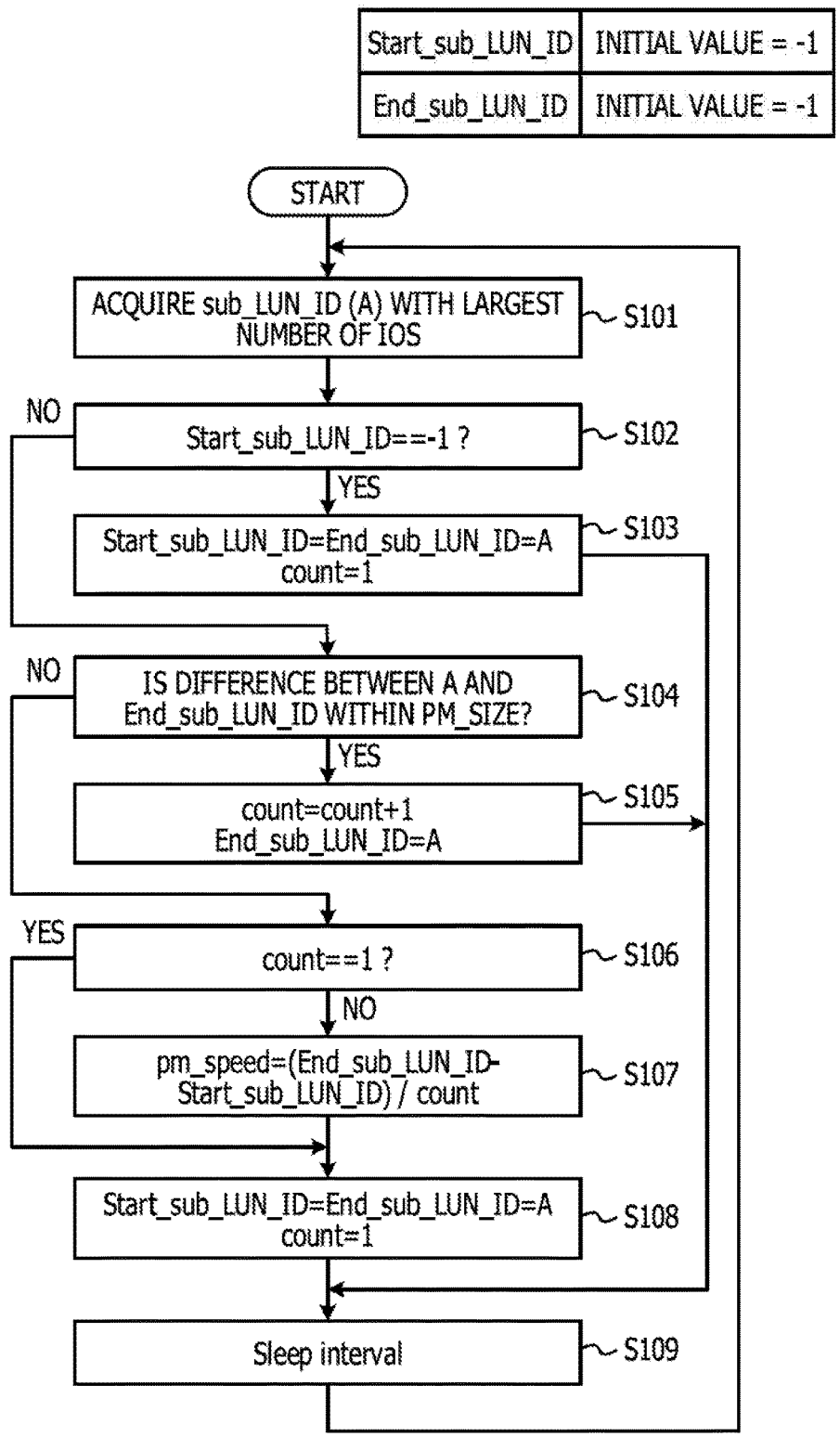
FIG. 20 is an explanatory flowchart of an example of a transition speed calculation procedure performed by the transition speed calculation unit.

Next, description will be given of an example of a procedure or calculating the transition speed by the transition speed calculation unit 11*h* with reference to the flowchart (Steps S101 to S109) illustrated in FIG. 20. In FIG. 20, PM_SIZE=5, and the specific time interval (Interval)=60 seconds. "Start_sub_LUN_ID" corresponds to the numerical value of the segment ID at the start point of the group and is set to −1 as an initial value. "End_sub_LUN_ID" corresponds to the numerical value of the segment ID at the end point of the group and is set to "−1" as an initial value.

The transition speed calculation unit 11*h* acquires the segment ID (sub_LUN_ID) of the segment with the largest number of IOs at a specific time interval (Step S101). Hereinafter, the segment ID (sub_LUN_ID) acquired in Step S101 will be described as "A".

Then, the transition speed calculation unit 11*h* determines whether or not "Start_sub_LUN_ID" is −1 (Step S102). In a case where "Start_sub_LUN_ID" is −1 (YES route of Step S102), the transition speed calculation unit 11*h* sets "Start_sub_LUN_ID" and "End_sub_LUN_ID" to "A" and sets a count value "count" by the counter that counts elapsed time to "1" (Step S103). Thereafter, the transition speed calculation unit 11*h* sleeves for predetermined time such as sixty seconds (Step S109), and the processing proceeds to Step S101.

In a case where "Start_sub_LUN_ID" is not "−1" (NO route of Step S102), the transition speed calculation unit 11*h* determines whether or not a difference between the segment ID "A" acquired this time and "End_sub_LUN_ID" is within PM_SIZE (5, for example) (Step S104). In a case where the difference is within PM_SIZE (5, for example) (YES route of Step S104), the transition speed calculation unit 11*h* adds 1 to the count value "count" and sets "End_sub_LUN_ID" to the segment ID "A" acquired this time (Step S105). Thereafter, the transition speed calculation unit 11*h* sleeps for predetermined time such as sixty seconds (Step S109), and the processing proceeds to Step S101.

In a case where the difference exceeds PM_SIZE (5, for example) (NO route of Step S104), the transition speed calculation unit 11*h* determines whether not the count value "count" is "1" (Step S106). In a case where the count value "count" is "1" (YES route of Step S106), the transition speed calculation unit 11*h* sets "Start_sub_LUN_ID" and "End_sub_LUN_ID" to "A" and sets the count value "count" to "1" (Step S108). Thereafter, the transition speed calculation unit 11*h* sleeps for predetermined time such as sixty seconds (Step S109), and the processing proceeds to Step S101.

In a case where the count value "count" is not "1" (NO route of Step S106), the transition speed calculation unit 11*h* calculates (End_sub_LUN_ID−Start_sub_LUN_ID) as the transition speed pm_speed and then moves on to the processing in Step S108.

In a case where the specific access log illustrated in FIG. 18 is applied to the flowchart illustrated in FIG. 20, the following operation is performed. Here, description will be given of an operation in a case where the processing of the flowchart illustrated in FIG. 20 is started at the clock time 14 of the access log illustrated in FIG. 18, for example. "Start_sub_LUN_ID" and "End_sub_LUN_ID" are set to the initial value "−1" at the start timing of the processing.

First, "76" is acquired as "sub_LUN (A) with the largest number of IOs" in Step S101 at the clock time 14, and it is determined that "Start_sub_LUN_ID" is "−1_" in Step S102 (YES route). Correspondingly, both "Start_sub_LUN_ID" and "End_sub_LUN_ID" are set to "76" and the count value "count" is set to "1" in Step S103.

"76" is acquired as "sub_LUN (A) with the largest number of IOs" in Step S101 at the clock time 15, and it is determined that "Start_sub_LUN_ID" is not "−1" in Step S102 (NO route). Then, it is determined in Step S104 that a difference "0" between A="76" and "End_sub_LUN_ID"="76" is within PM_SIZE=5 (YES route). Correspondingly, "End_sub_LUN_ID" is set to "76" and the count value "count" is set to "2" in Step S105.

"92" is acquired as "sub_LUN (A) with the largest number of IOs" in Step S101 at the clock time 16, and it is determined in Step S102 that "Start_sub_LUN_ID" is not "−1" (NO route). Then, it is determined in Step S104 that a difference "16" between A="92" and "End_sub_LUN_ID"="76" exceeds PM_SIZE=5 (NO route). Furthermore, it is determined in Step S106 that the count value "count"="2" is not 1 (NO route). Correspondingly, the transition speed pm_speed=(End_sub_LUN_ID−Start_sub_LUN_ID)/count=(76−76)/2=0 sub_LUN/minute is calculated in Step S107. Thereafter, both "StartsubLUNID" and "End_sub_LUN_ID" are set to "92" and the count value "count" is set to "1" in Step S108.

"92" is acquired as "sub_LUN (A) with the largest number of IOs" in Step S101 at the clock time 17, and it is determined in Step S102 that "Start_sub_LUN_ID" is not "−1" (NO route). Then, it is determined in Step S104 that a difference "0" between A="92" and "End_sub_LUN_ID"="92" is within PM_SIZE=5 (YES route). Correspondingly, "End_sub_LUN_ID" is set to "92" and the count value "count" is set to "2" in Step S105.

"95" is acquired as "sub_LUN (A) with the largest number of IOs" in Step S101 at the clock time 18, and it is determined in Step S102 that "Start_sub_LUN_ID" is not "−1" (NO route). Then, it is determined in Step S104 that a difference "3" between A="95" and "End_sub_LUN_ID"="92" is within PM_SIZE=5 (YES route). Correspondingly, "End_sub_LUN_ID" is set to "95" and the count value "count" is set to "3" in Step S105.

Thereafter, the same operation is repeatedly executed, and "102" is acquired as "sub_LUN (A) with the largest number of IOs" in Step S101 at the clock time 24, and it is determined in Step S102 that "Start_sub_LUN_ID" is not "−1" (NO route). Then, it is determined in Step S104 that a difference "1" between A="102" and "End_sub_LUN_ID"="101" is within PM_SIZE=5 (YES route). Correspondingly, "End_sub_LUN_ID" is set to "102" and the count value "count" is set to "9" in Step S105.

"3" is acquired as "sub_LUN (A) with the largest number of IOs" in Step S101 at the clock time 25, and it is determined in Step S102 that "Start_sub_LUN_ID" is not "−1" (NO route). Then, it is determined in Step S104 that a difference "89" between A="3" and "End_sub_LUN_ID"="102" exceeds PM_SIZE=5 (NO route). Furthermore, it is determined in Step S106 that the count value "count"="9" is not 1 (NO route). Correspondingly, the transition speed pm_speed=(End_sub_LUN_ID−Start_sub_LUN_ID)/count=(102−92)/9 =10/9 =1.11 sub_LUN/minute is calculated in Step S107. Thereafter, both "Start_sub_LUN_ID" and "End_sub_LUN_ID" are set to "3" and the count value "count" is set to "1" in Step S108.

Next, description will be given of an example of a procedure for calculating the growth time by the growth time calculation unit 11i with reference to the flowchart (Steps S111 to S117) illustrated in FIG. 21.

The growth time calculation unit 11i acquires the segment ID (sub_LUN_ID) of the segment with the largest number of IOs at specific time interval (Step S111) and sets i=1 (Step S112). Hereinafter, the segment ID (sub_LUN_ID) acquired in Step S111 will described as "A".

Then, the growth time calculation unit 11i refers to a history (see the access log in FIG. 19, for example) of all the segments (sub_LUN) at clock time of i minutes ago. In doing so, the growth time calculation unit 11i searches for a segment (sub_LUN) with the segment ID (sub_LUN_ID) that coincides with A from among all the segments at the clock time of i minutes ago (Step S113).

The growth time calculation unit 11i determines whether or not the number of IOs in the segment (sub_LUN) searched for in Step S113 is equal to or less than the predetermined value 20 (Step S114). In a case where the number of IOs exceeds the predetermined value 20 (NO route of Step S114), the growth time calculation unit 11i replaces i with i+1 (Step S115) and returns to the processing in Step S113.

In contrast, in a case where the number of IOs is equal to or less than the predetermined value 20 (the "YES" route of Step S114), the growth time calculation unit 11i calculates "i" as the growth time pm_growth (Step S116). Thereafter, the growth time calculation unit 11i sleeps for predetermined time such as sixty seconds (Step S117), and the processing proceeds to Step S111.

Figure 21:
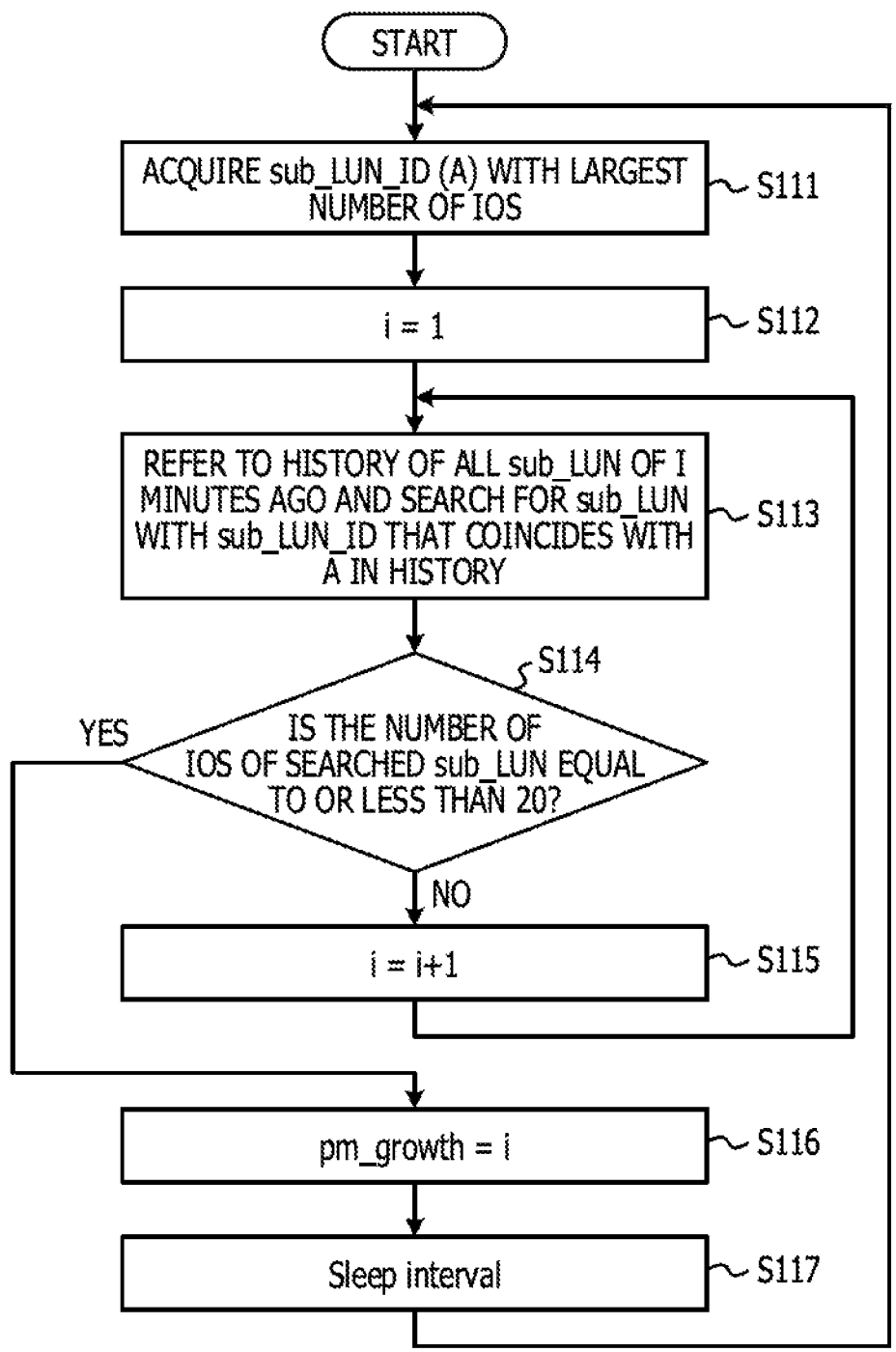
FIG. 21 is an explanatory flowchart of an example of a growth time calculation procedure performed by the growth time calculation unit.

In a case of applying the specific access log illustrated in FIG. 19 to the flowchart illustrated in FIG. 21, the following operation is performed. Here, description will be given of an operation in a case where the processing of the flowchart illustrated in FIG. 21 is started at the clock time 20 of the access log illustrated in FIG. 19, for example.

"96" is acquired as "sub_LUN ID (A) with the largest number of IOs" in Step S111 at the clock time 20, and i=1 is set in Step S112.

Thereafter, a history of all the segment at the clock time 19 of one minute ago is referred to in Step S113. At this time, a segment with a segment ID that coincides with "96" is searched for from among all the segments at the clock time 19 of one minute ago, and it is determined that the number of IOs therein exceeds 20 (NO route of Step S114). Correspondingly, i=1+1=2 is set in Step S115.

Then, a history of all the segments at the clock time 18 of two minutes ago is referred to in Step S113. At this time, a segment with a segment ID that coincides with "96" is searched for from among twenty higher-order segments at the clock time 18 of two minutes ago, and it is determined that the number of IOs therein is equal to or less than 20 (YES route of Step S114). Correspondingly, "2" is calculated as the growth time pm_growth in Step S116.

As described above, the latest segment ID "96" of the segment with the largest number of IOs at the clock time 20 as the latest predetermined timing is extracted, and all the segment IDs extracted at the clock time 19 and the clock time 18 as the predetermined timing in the past are referred to. In doing so, the oldest predetermined timing when the number of IOs in the segment with the latest segment ID "96" exceeds the predetermined value 20 at the timing before the latest predetermined timing (clock time 20) is obtained, and the growth time pm_growth is calculated.

Figure 22:
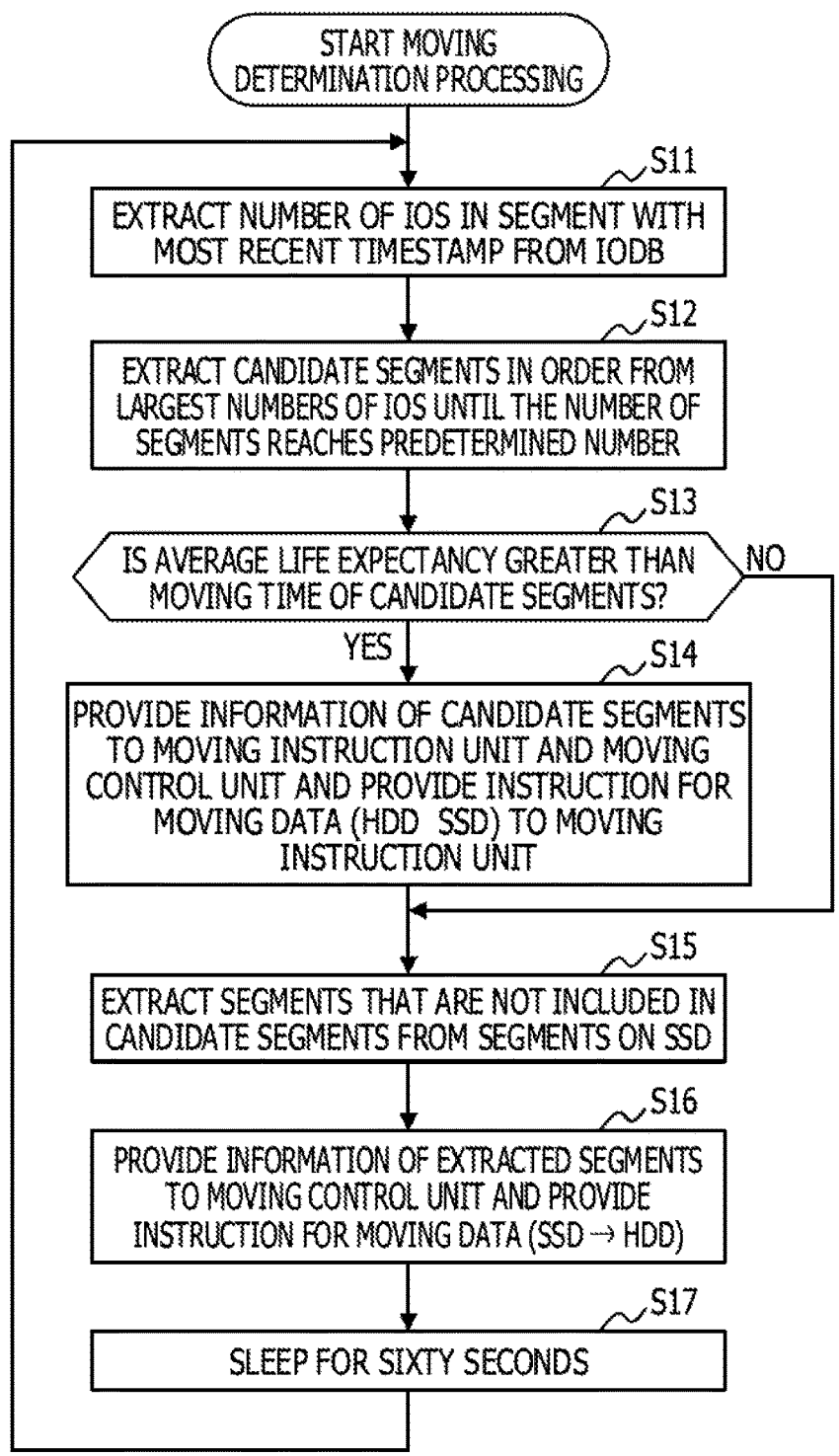
FIG. 22 is an explanatory flowchart of an operation example of moving determination processing performed by the workload analysis unit.

Next, description will be given of an operation example of moving determination processing performed by the workload analysis unit 11c with reference to FIG. 22. As illustrated in FIG. 22, the workload analysis unit 11c extracts the number of IOs in the segment with the most recent timestamp from the IODB 11b (Step S11) and extracts candidate segments in an order from the largest number of IOs until the number of segments reaches a predetermined number (Step S12).

Then, the workload analysis unit 11c determines whether or not an average life expectancy obtained in advance is greater than moving time of all the candidate segments (Step S13).

In a case where the average life expectancy is equal to or less than the moving time (NO route of Step S13), the processing proceeds to Step S15. In contrast, if the average life expectancy is greater than the moving time (YES route of Step S13), the workload analysis unit 11c provides information of the candidate segments to the moving instruction unit 11d and the moving control unit 11e and provides an instruction for moving data (from the HDD 30 to the SSD 20) (Step S14), and the processing proceeds to Step S15.

In Step S15, the workload analysis unit 11c extracts segments that are not included in the candidate segments, for example, segments with relatively small numbers of IOs, from among the segments on the SSD 20. Then, the workload analysis unit 11c provides information of the extracted segments to the moving control unit 11e and provides an instruction for moving data (from the SSD 20 to the HDD 30) (Step S16).

Then, the workload analysis unit 11c sleeps for predetermined time such as sixty seconds (Step S17), and the processing proceeds to Step S11.

The workload analysis unit 11c may extract segments with the number of IOs or an access concentration rate (a rate of the number of IOs with respect to the entire IOs) that is equal to or greater than a predetermined threshold value in Step S12. The workload analysis unit 11c may extract segments with the number of IO or the access concentration rate that is equal to or less than a predetermined threshold value on the SSD 20 as segments from which data is moved to the HDD 30 in Step S15. Furthermore, the workload analysis unit 11c may select segments that continuously meet the extraction condition a predetermined number of times or more as the segments to be extracted in Steps S12 and S15.

As described above, the workload analysis unit 11c provides the instruction for moving the data in the segment with a high degree of IO concentration from the HDD 30 to the SSD 20 to the moving instruction unit 11d and the moving control unit 11e, thereby allowing the user to access the data in the HDD 30 at a high speed.

The workload analysis unit 11c can effectively utilize the relatively expensive low-capacity SSD 20 by providing, to the moving control unit 11e, an instruction for moving data in the segment with a low degree of IO concentration from the SSD 20 to the HDD 30.

Figure 23:
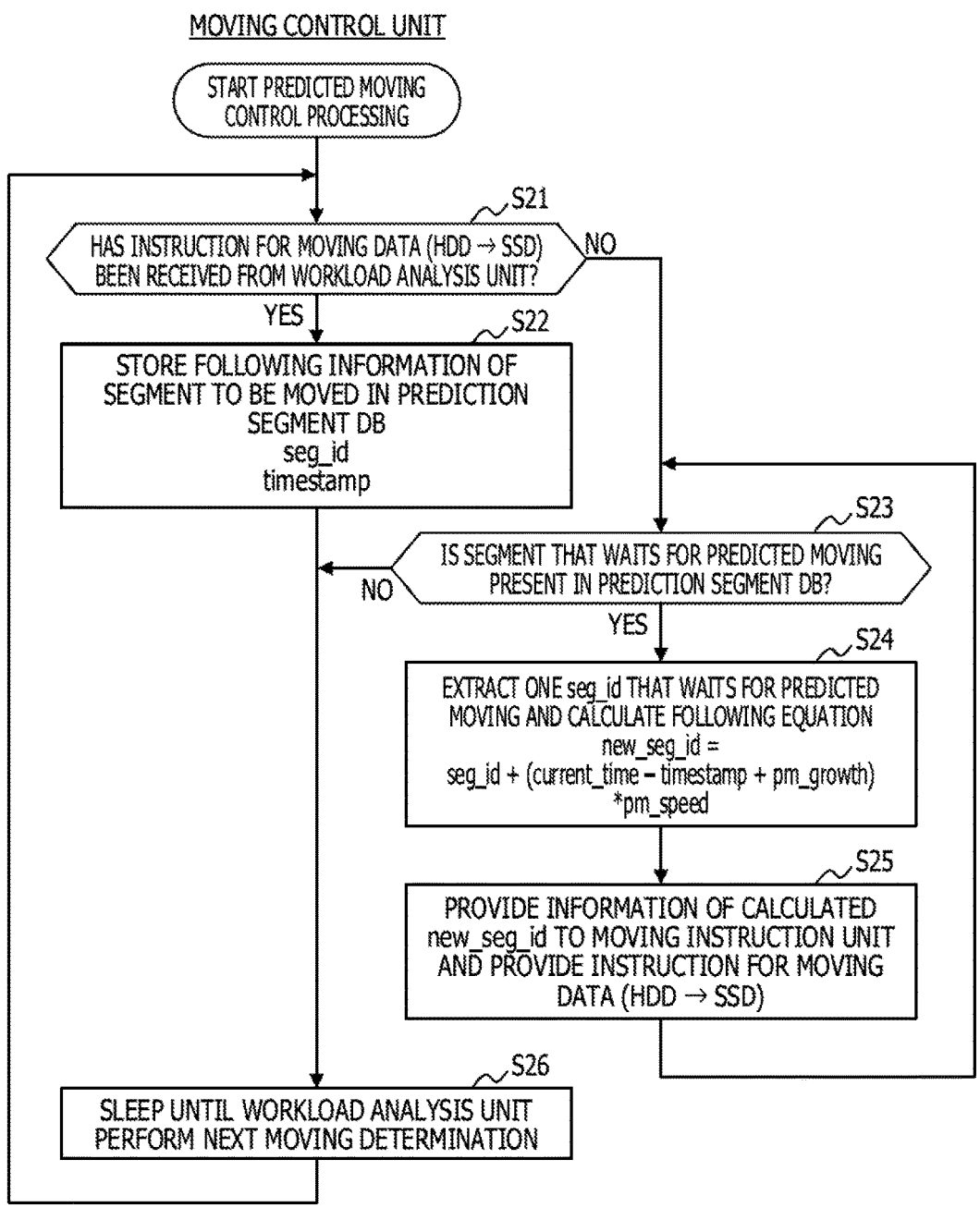
FIG. 23 is an explanatory flowchart of an operation example of predicted moving control processing performed by the moving control unit.

Next, description will be given of predicted moving control processing performed by the moving control unit 11e with reference to FIG. 23. As illustrated in FIG. 23, the moving control unit 11e determines whether or not the instruction for moving the data (from the HDD 30 to the SSD 20) has been received from the workload analysis unit 11c (Step S21), and in a case where the instruction for moving the data has been received (YES route of Step S21), the processing proceeds to Step S22.

In Step S22, the moving control unit 11e stores the ID "seg_id" (=sub_LUN_ID) of the segment from which the data is to be moved in response to the instruction from the workload analysis unit 11c along with the timestamp in the prediction segment DB 11f. Thereafter, the moving control unit 11e sleeps until the workload analysis unit 11c performs the next moving determination (Step S26), and the processing proceeds to Step S21.

In contrast, in a case where the instruction for moving the data has not been received from the workload analysis unit 11c in Step S21 (NO route of Step S21), the moving control unit 11e determines whether or not segments that wait for the predicted moving are present in the prediction segment DB 11f (Step S23).

In a case where no segments that wait for the predicted moving are present (NO route of Step S23), the processing proceeds to Step S26. In contrast, in a case where segments that wait for the predicted moving are present (YES in Step S23), the moving control unit 11e extracts "seg_id" that wait for the predicted moving one by one from the prediction segment DB 11f and calculates the ID "new_seg_id" (=new_sub_LUN_ID) of the transition destination segment by the aforementioned Equation (1) (Step S24).

Then, the moving control unit 11e provides information about calculated "new_seg_id" to the moving instruction unit 11d and provides an instruction for moving data (from the HDD 30 to the SSD 20) (Step S25), and the processing proceeds to Step S23.

As described above, the moving control unit 11e can calculate the prediction segment at a target of the predicted moving based on the information of the segment from which the data is to be moved from the HDD 30 to the SSD 20 in response to the instruction and provide, to the moving instruction unit 11d, an information of moving the segment based on the prediction segment (transition destination segment) at timing when no instruction for moving data is provided. Therefore, it is possible to perform effective hierarchical moving of the segment on which IOs concentrate in the near future without affecting the operation of the hierarchical moving based on the analysis performed by the workload analysis unit 11c.

Figure 24:
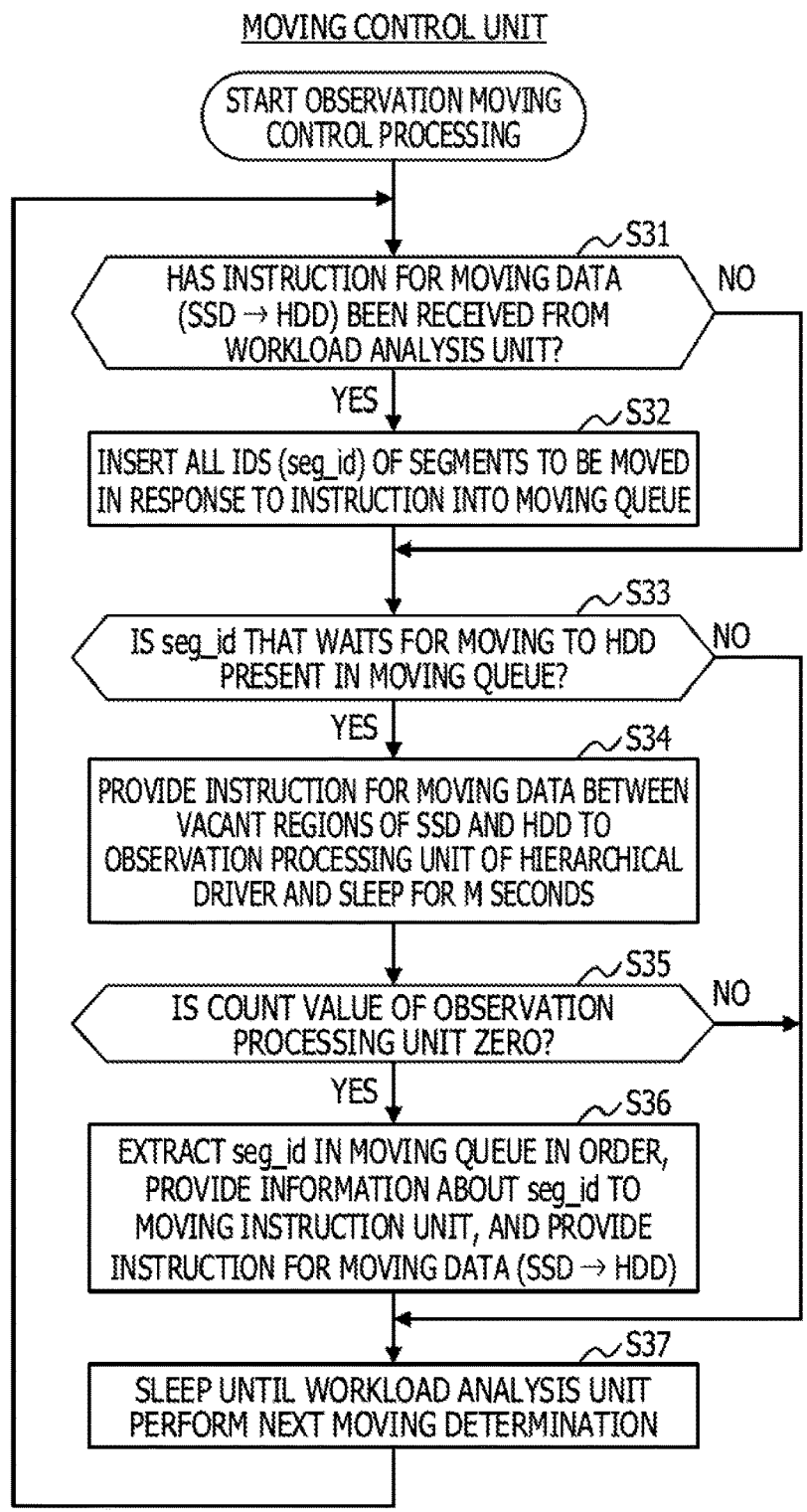
FIG. 24 is an explanatory flowchart of an operation example of observation moving control processing performed by the moving control unit.

Next, description will be given of an operation example of observation moving control processing performed by the moving control unit 11e with reference to FIG. 24. As illustrated in FIG. 24, the moving control unit 11e determines whether or not the instruction for moving data (from the SSD 20 to the HDD 30) has been received from the workload analysis unit 11c (Step S31), and in a case where the instruction for moving data has not received (NO route of Step S31), the processing proceeds to Step S33.

In a case where the instruction for moving data has received (YES route of Step S31), the moving control unit 11e inserts all the IDs "seg_id" of the segments from which data is to be moved in response to an instruction from the workload analysis unit 11c into the moving queue 11g (Step S32), and the processing proceeds to Step S33.

In Step S33, the moving control unit 11e determines whether or not "seg_id" that waits for the moving to the HDD 30 is present in the moving queue 11g. In a case where no "seg_id" that weights for the moving is present (NO route of Step S33), the moving control unit 11e sleeps until the workload analysis unit 11c performs the next moving determination (Step S37), and the processing proceeds to Step S31.

In a case where "seg_id" that waits for the moving is present in Step S33 (YES route of Step S33), the moving control unit 11e provides, to the observation processing unit 12e of the hierarchical driver 12, an instruction for moving data between vacant regions of the SSD 20 and the HDD 30 and sleeps for predetermined time such as M seconds (M is a real number that is equal to or greater than 0) (Step S34).

In Step S34, the moving control unit 11e provides at least one information item about "seg_id" that waits for moving to the observation processing unit 12e and provides an instruction for performing the observation moving of a region with the observation size in the segment indicated by the information. The moving control unit 11e may convert an offset on the volume in the vacant region in the SSD 20 into an offset on the HDD 30 and include the converted offset in the instruction for performing the observation moving.

Then, the moving control unit 11e determines whether or not the count value of the counter 12f, which is provided from the observation processing unit 12e, is zero (Step S35). In a case where the count value is not zero (NO route of Step S35), the processing proceeds to Step S37. In contrast, in a case where the count value is zero (YES route of Step S35), the moving control unit 11e extracts "seg_id" in the moving queue 11g in order, provides "seg_id" to the moving instruction unit 11d, and provides an instruction for moving data (from the SSD 20 to the HDD 30) (Step S36), and the processing proceeds to Step S37.

The threshold value for the determination of the count value in Step S35 is not limited to zero, and another value may be set in consideration of a relationship with the predetermined threshold value of the counter 12f of the observation processing unit 12e.

As described above, the moving control unit 11e can provide the instruction for performing the observation moving of the observation size to the observation processing unit 12e before moving the segment from the SSD 20 to the HDD 30 and move the segment in accordance with the information related to the user IO response performance in the observation moving. Therefore, it is possible to perform the operation of the hierarchical moving based on the analysis performed by the workload analysis unit 11c at timing when the user IO response is not (or less) affected.

Figure 25:
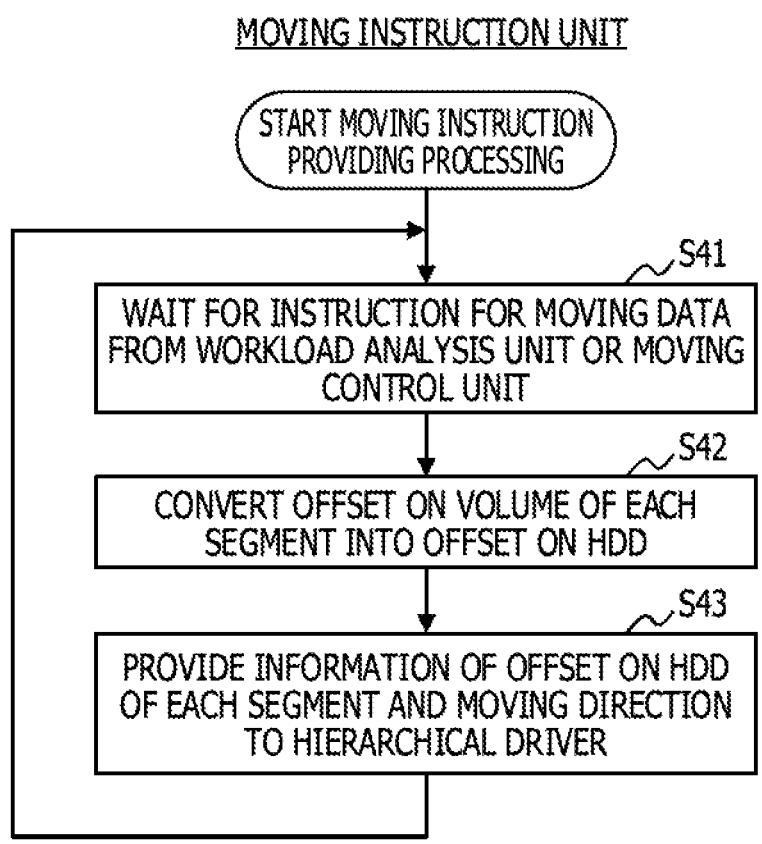
FIG. 25 is an explanatory flowchart of an operation example of moving instruction providing processing performed by a moving instruction unit.

Next, description will be given of an operation example of moving instruction providing processing performed by the moving instruction unit 11d with reference to FIG. 25. As illustrated in FIG. 25, the moving instruction unit 11d waits for the instruction for moving data from the workload analysis unit 11c or the moving control unit 11e (Step S41), receives the instruction for moving data, and then converts the offset on the volume of each segment into an offset on the HDD 30 (Step S42).

Then, the moving instruction unit 11d provides information of the offset on the HDD 30 and a data moving direction for each segment to the hierarchical driver 12 (moving processing unit 12d) (Step S43), and the processing proceeds to Step S41. At this time, the data moving direction provided to the moving processing unit 12d is from the HDD 30 to the SSD 20 or from the SSD 20 to the HDD 30.

As described above, the hierarchical driver 12 can move data between the SSD 20 and the HDD 30 by the moving instruction unit 11d converting the offset on the volume of each segment into the offset on the HDD 30.

Figure 26:
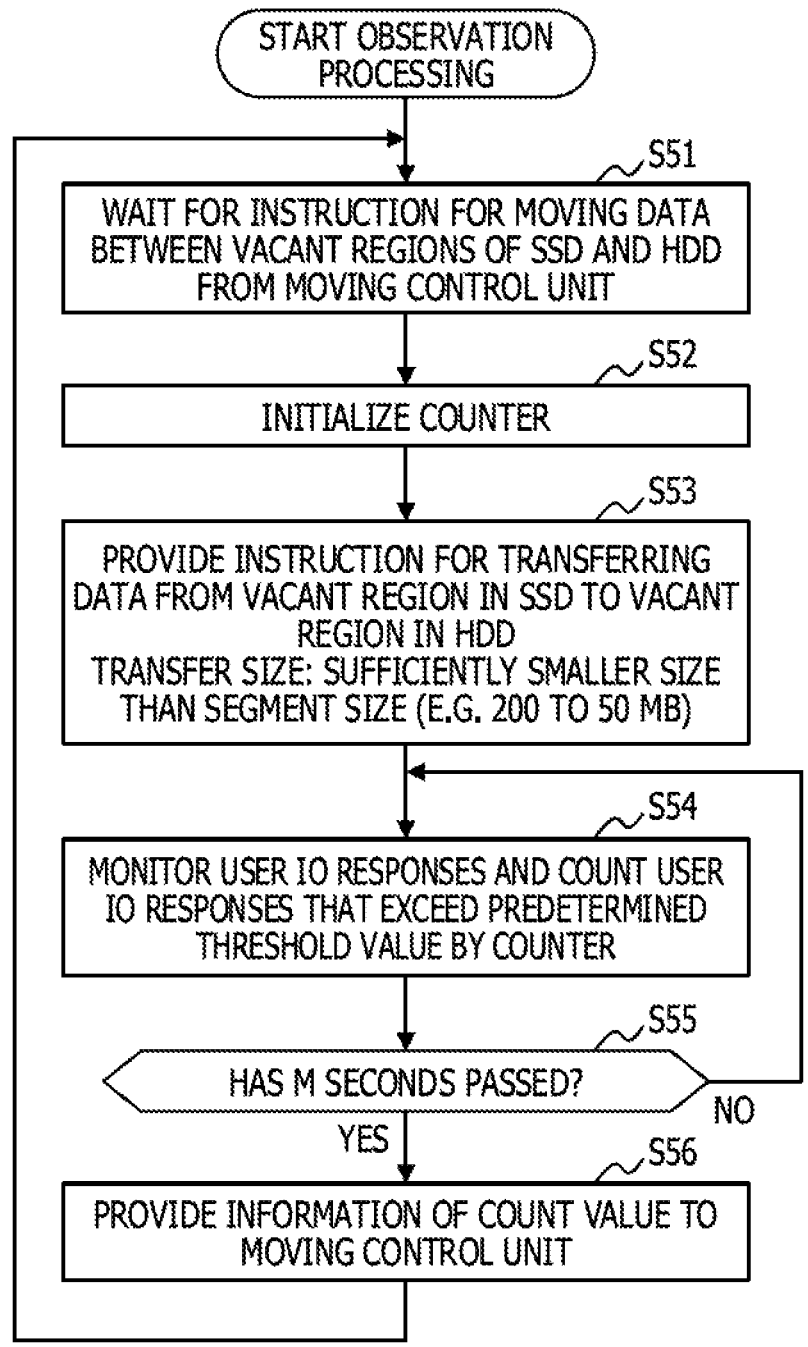
FIG. 26 is an explanatory flowchart of an operation example of observation processing performed by the observation processing unit.

Next, description will be given of an operation example of observation processing performed by the observation processing unit 12e with reference to FIG. 26. As illustrated in FIG. 26, the observation processing unit 12e waits for an instruction for moving data (instruction for performing the observation moving) between vacant regions of the SSD 20 and the HDD 30 from the moving control unit 11e (Step S51), and if the observation processing unit 12e receives the instruction for performing the observation moving, then the observation processing unit 12e initializes the counter 12f (Step S52).

Then, the observation processing unit 12e provides an instruction for transferring data from the vacant region in the SSD 20 to the vacant region in the HDD 30 to kcopyd (Step S53). At this time, the observation processing unit 12e counts predetermined time such as M seconds. The observation processing unit 12e may use offset information provided from the moving control unit 11e for specifying the moving target region or may refer to the hierarchical table 12c. The observation size in the observation moving is a sufficiently smaller size than the segment size, and in one embodiment, the observation size is from about 200 to 50 MB with respect to the segment size of 1 GB.

Then, the observation processing unit 12e monitors the user IO responses during the observation moving, count the number of user IO responses that exceed a predetermined threshold value by the counter 12f (Step S54), and determines whether or not M seconds has elapsed (Step S55).

In a case where M seconds has not elapsed (NO route of Step S55), the processing proceeds to Step S54. In contrast, in a case where M seconds has elapsed (YES route of Step S55), the observation processing unit 12e provides information about the count value to the moving control unit 11e (Step S56), and the processing proceeds to Step S51.

As described above, the observation processing unit 12e can observe the user IO responses during the observation moving in real time, thereby precisely detecting optimal timing when the hierarchical moving (from the SSD 20 to the HDD 30) is to be performed.

Figure 27:
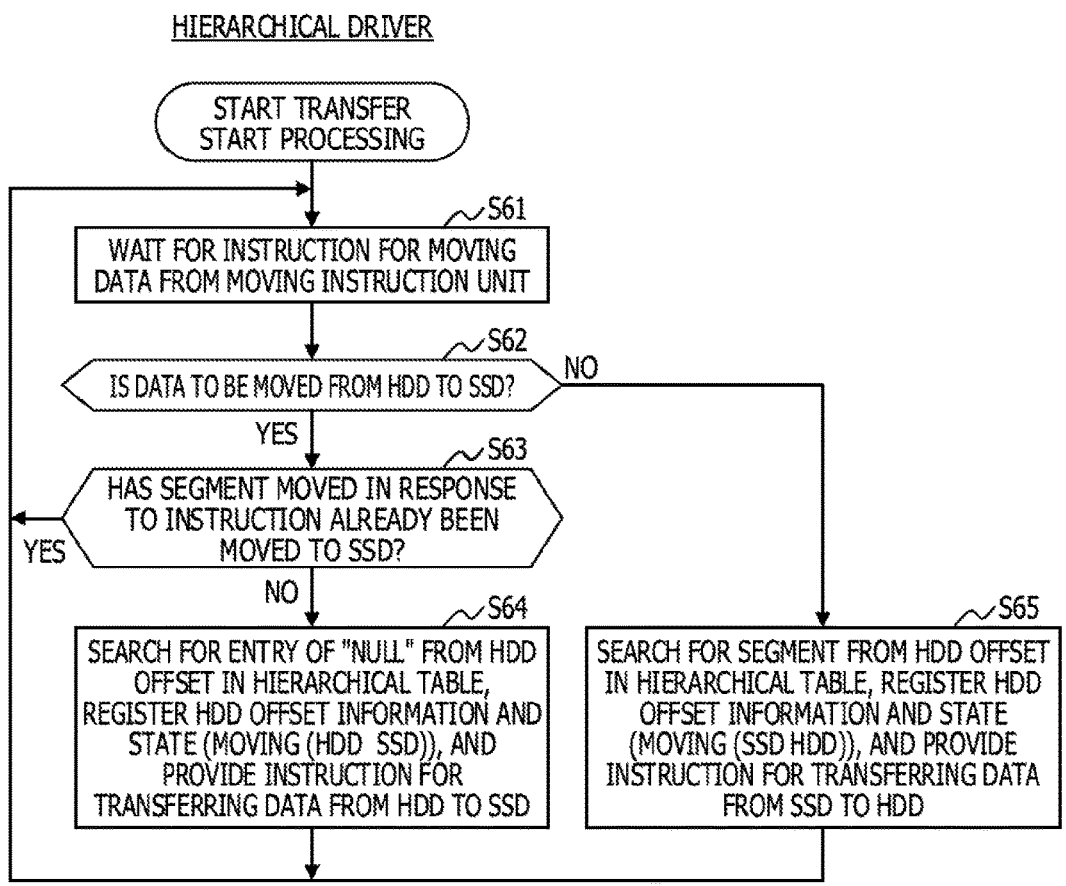
FIG. 27 is an explanatory flowchart of an operation example of transfer start processing performed by a moving processing unit of a hierarchical driver.

Next, description will be given of an operation example of transfer start processing performed by the moving processing unit 12d of the hierarchical driver 12 with reference to FIG. 27. As illustrated in FIG. 27, the moving processing unit 12d waits for an instruction for moving data from the moving instruction unit 11d (Step S61), receives the instruction for moving data, and then determines whether or not the data is moved from the HDD 30 to the SSD 20 (Step S62).

In a case where the data is moved from the HDD 30 to the SSD 20 (YES route of Step S62), the moving processing unit 12d determines whether or not the segment indicated as a target of moving has already been moved to the SSD 20 (Step S63). In a case where the segment has already been moved (YES route of Step S63), the processing proceeds to Step S61.

In a case where the segment has not been moved (NO route of Step S63), the moving processing unit 12d searches for an entry of "NULL" from the HDD offset in the hierarchical table 12c, and registers HDD offset information and a state. At this time, the state registered by the moving processing unit 12d is "Moving (HDD→SSD). Then, the moving processing unit 12d issues an instruction for transferring data from the HDD 30 to the SSD 20 for kcopyd (Step S64), and the processing proceeds to Step S61.

In a case where the instruction for moving data does not indicate moving of data from the HDD 30 to the SSD 20 in Step S62 (NO route of Step S62), the moving processing unit 12d searches for a segment from the HDD offset in the hierarchical table 12c and registers HDD offset information and a state. At this time, the state registered by the moving processing unit 12d is "Moving (SSD→HDD). Then, the moving processing unit 12d issues an instruction for transferring data from the SSD 20 to the HDD 30 for kcopyd (Step S65), and the processing proceeds to Step S61.

Figure 28:
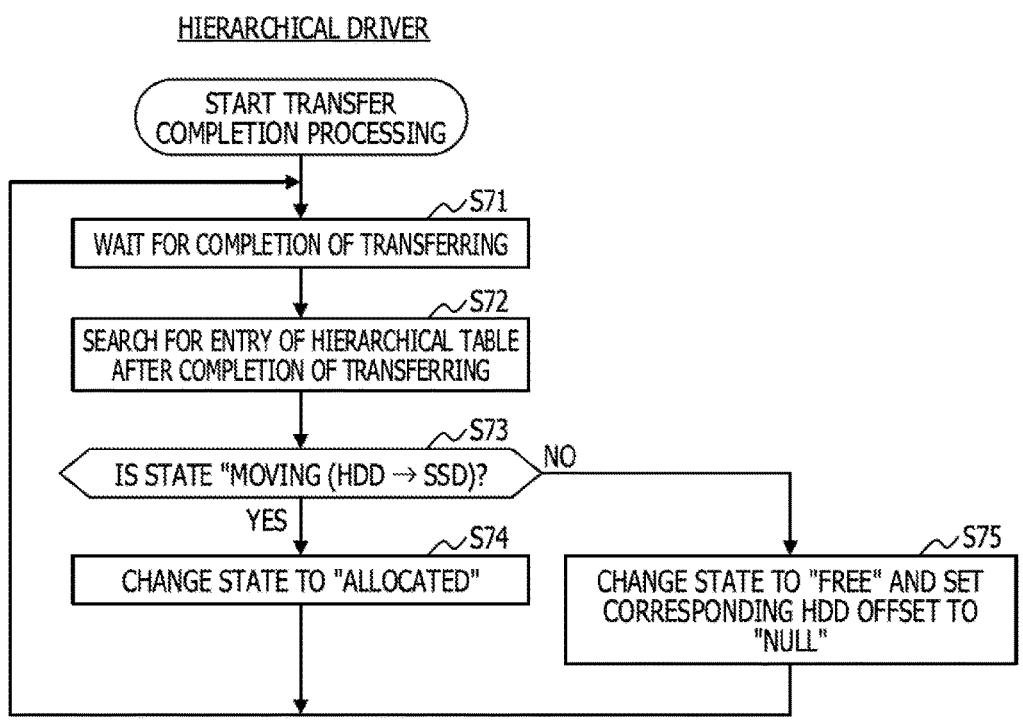
FIG. 28 is an explanatory flowchart of an operation example of transfer completion processing performed by the moving processing unit of the hierarchical driver.

Next, description will be given of an operation example of transfer completion processing performed by the moving processing unit 12d of the hierarchical driver 12 with reference to FIG. 28. As illustrated in FIG. 28, the moving processing unit 12d waits for completion of the transfer by kcopyd (Step S71), and if the transfer is completed, then the moving processing unit 12d searches for the entry in the hierarchical table 12c after completion of the transfer by using the HDD offset (Step S72).

Then, the moving processing unit 12d determines whether or not a state of the searched entry is "Moving (HDD→SSD) (Step S73). In a case where the state is "Moving (HDD→SSD) (YES route of Step S73), the moving processing unit 12d changes the state to "allocated" (Step S74), and the processing proceeds to Step S71.

In contrast, in a case where the state is not "Moving (HDD→SSD) (the state is "Moving (SSD→HDD)) (NO route of Step S73), the moving processing unit 12d changes the state to "free" and sets the corresponding HDD offset to "NULL" (Step S75), and the processing proceeds to Step S71.

As described above, the dynamic hierarchical control performed by the workload analysis unit 11c and the moving control unit 11e is realized by the hierarchical driver 12 (moving processing unit 12d) transferring data between the SSD 20 and the HDD 30 by using the hierarchical table 12c.

Finally, description will be given of an operation example of IO reception processing performed by the IO map unit 12a with reference to FIG. 29. As illustrated in FIG. 29, the IO map unit 12a waits for reception of a user IO (Step S81), receives a user 10, and then compares an offset designated by the user IO with each offset and a segment size registered in the hierarchical table 12c (Step S82).

Then, the IO map unit 12a determines whether a coincident offset is present in the hierarchical table 12c and the state is "allocated" based on a result of the comparison (Step S83). In a case where the coincident offset is present and the state is "allocated" (YES route of Step S83), the IO map unit 12a sends an IO request to the SSD driver 13 (Step S84), and the processing proceeds to Step S81.

In contrast, in a case where no coincident offset is present or the state is not "allocated" (NO route of Step S83), the IO map unit 12a determines whether or not the state is "Moving (HDD→SSD)" or "Moving (SSD→HDD)" (Step S85). In a case where the state is a state other than "Moving (HDD→SSD)" or "Moving (SSD→HDD)" (NO route of Step S85), the IO map unit 12a sends an IO request to the HDD driver 14 (Step S86), and the processing proceeds to Step S81.

In a case where the state is "Moving (HDD→SSD)" or "Moving (SSD→HDD)" in Step S85 (YES route of Step S85), the IO map unit 12a stores the IO request in the IO queue 12b until the state changes to "free" or "allocated". That is, the IO map unit 12a suspends the IO request until the hierarchical moving of the segment related to the IO request is completed (Step S87). If the hierarchical moving is completed, the IO map unit 12a extracts the IO request stored in the IO queue 12b, and the processing proceeds to Step S83.

[1-6] Hardware Configuration Example of Hierarchical Storage Control Device

Next, description will be given of a hardware configuration example of the hierarchical storage control device 10 illustrated in FIG. 1 with reference to FIG. 30. As illustrated in FIG. 30, the hierarchical storage control device 10 can include a CPU 10a, a memory 10b, a storage unit 10c, an interface unit 10d, and an input and output unit 10e in an illustrative example.

The CPU 10a is an example of a processor that performs various kinds of control and operation. The CPU 10a may be coupled to each block in the hierarchical storage control device 10 via a bus so as to be able to communicate with each other. As the processor, an electronic circuit or an integrated circuit (IC) such as a Micro Processing Unit (MPU) may be used instead of the CPU 10a.

The memory 10b is an example of hardware that stores various kinds of data and programs. At least one of the IODB 11b, the prediction segment DB 11f, the moving queue 11g, and the IO queue 12b illustrated in FIG. 1 may be realized by a storage region in the memory 10b. As the memory 10b, a volatile memory such as a Random Access Memory (RAM) is exemplified.

The storage unit 10c is an example of hardware that stores various kinds of data and programs. As the storage unit 10c, various storage devices including a magnetic disk device such as an HDD, a semiconductor drive device such as an SSD, and a non-volatile memory such as a flash memory and a Read Only Memory (ROM) are exemplified.

For example, the storage unit 10c may store a storage control program 100 that realizes an entirety or a part of various functions of the hierarchical storage control device 10. In such a case, the CPU 10a can realize the functions of the hierarchical storage control device 10 by developing and executing the storage control program 100 stored in the storage unit 10c in the memory 10b.

The interface unit 10d is an example of a communication interface that control connection and communication of the SSD 20, the HDD 30, the host device which is not illustrated in FIG. 30, or an operation terminal of an operator. For example, the interface unit 10d may include various controllers, an adaptor to which devices are coupled, and a reading unit that reads data and programs recorded in a recording medium 10f. The controller may include an I/O controller (IOC) that controls communication between the SSD 20 and the HDD 30, for example and the adaptor may include a Device Adapter (DA) that couples the SSD 20 and the HDD 30, for example, and a Channel Adapter (CA) that couples the host device. As the CA, a CA that is compliant with a Local Area Network (LAN), a Storage Area Network (SAN), a Fibre Channel (FC), an InfiniBand, or the like is exemplified.

The reading unit may include a connection terminal or device to which the computer readable recording medium 10f can be coupled or inserted. As the reading unit, an adaptor that is compliant with a Universal Serial Bus (USB), for example, a drive device that accesses a recording disk, and a card reader that accesses a flash memory such as an SD cart are exemplified. The recording medium 10f may store the storage control program 100.

The input and output unit 10e may include at least a part of input units such as a mouse, a keyboard, and an operation button and output units such as a display. For example, the input unit may be used for operations of registering or changing setting by a user or an operator and inputting various operations and data such as selection (switching) of a system mode, and the output unit may be used for checking the setting by the operator or outputting various kinds of information.

The hardware configuration of the hierarchical storage control device 10 was described above for the illustrative purpose. Therefore, an increase or a decrease of hardware in the hierarchical storage control device 10 (arbitrary addition or omission of blocks, for example), division, integration in an arbitrary combination, addition or omission of a bus, and the like may be appropriately performed.

[2] Others

The technology according to the aforementioned embodiment can be performed in the following modified or changed manner.

For example, the respective functional blocks in the hierarchical storage control device 10 illustrated in FIG. 1 may be integrated in an arbitrary combination or may be divided.

Although the description was given on the assumption that the workload analysis unit 11c and the moving processing unit 12d determined a moving target region in units of segments and provided an instruction for performing the hierarchical moving to the moving instruction unit 11d, the embodiment is not limited thereto.

For example, the moving target region specified by the workload analysis unit 11c may be a region obtained by coupling regions in the vicinity of the high-load region. In such a case, the workload analysis unit 11c may provide a segment ID or information indicating an offset range as information of the moving target segment to the moving control unit 11e or the moving instruction unit 11d.

The moving control unit 11e may predict a region with the same size, on which the IOs will concentrate in the future, based on the information of a plurality of segments included in the indicated range or a region size of the range in the predicted moving control.

As a method of the prediction, it is possible to exemplify a method of setting an arbitrary segment such as a head offset, an intermediate offset, or a final offset of the indicated range as a representative segment and calculating the prediction segment for the representative segment by the moving control unit 11e. In such a case, the moving control unit 11e may obtain the range of the predicted segment after correction based on the number of segments included in the indicated range and provides information of the range to the moving instruction unit 11d.

Alternatively, the moving control unit 11e may obtain a prediction segment for each of the plurality of segments included in the indicated range.

In the observation moving control, information of each of the plurality of segments included in the indicated range is stored in the moving queue 11g. Therefore, the moving control unit 11e may read the respective segments in the moving queue 11g in order and provides an instruction for performing the hierarchical moving to the moving instruction unit 11d as described above in the embodiment in a case where no deterioration of IO responses is detected.

The moving instruction unit 11d may issue an instruction for moving each of the plurality of segments included in the indicated range to the hierarchical driver 12.

Although the description was given of the functions of the transition speed calculation unit 11h and the growth time calculation unit 11i in the case where the workload analysis unit 11c was provided in the embodiment, the embodiment is not limited thereto. The functions of the transition speed calculation unit 11h and the growth time calculation unit 11i may be provided in the hierarchical management unit 11 (the moving control unit 11e, for example).

Although the description was given of the case where the aforementioned embodiment was applied to a hierarchical storage, the embodiment is not limited thereto. The embodiment can be similarly applied to a case where a first storage device such as an SSD is a cache memory, and the same effects and advantages as those in the aforementioned embodiment can be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus configured to control moving of data stored in a first storage region selected from a plurality of storage regions of a first storage device to a second storage device, the apparatus comprising:
    a memory; and
    a processor coupled to the memory and configured to:
        obtain logs of accesses to the plurality of storage regions respectively,
        specify, from the plurality of storage regions based on the logs of the accesses, an access concentration region in which a number of the accesses per a certain time unit is equal to or greater than a first number,
        specify, based on the logs of the accesses, a transition speed of the access concentration region when the access concentration region is transited between the plurality of storage regions,
        specify, based on the logs of the accesses, a first time period in which the number of the accesses to a certain storage region of a plurality of storage regions changes from a second number less than the first number to the first number,
        predict, based on the transition speed and the first time period, that the number of accesses to the first storage region becomes equal to or greater than the first number at a first time, and
        move data stored in the first storage region to the second storage device at a certain time which is determined based on the first time.

2. The information processing apparatus according to claim 1, wherein the processor is configured to obtain the logs of the accesses at a certain time interval.

3. The information processing apparatus according to claim 1, wherein the processor is configured to move the data to the second storage device before the number of the accesses to the first storage region becomes equal to or greater than the first number.

4. The information processing apparatus according to claim 1, wherein the plurality of storage regions are regions obtained by dividing a storage volume of the first storage device into certain sizes and are regions of minimum units of moving of data from the first storage device to the second storage device.

5. The information processing apparatus according to claim 1, wherein a speed of the access to the first storage device is lower than a speed of the access to the second storage device.

6. The information processing apparatus according to claim 5, wherein the first storage device is a hard disk drive, and the second storage device is a solid state drive.

7. The information processing apparatus according to claim 1, wherein the transition speed is defined by the number of storage regions where the access concentration region has transited in a certain time unit.

8. The information processing apparatus according to claim 2, wherein ascending numbers or descending numbers corresponding to an arrangement order of the plurality of storage regions are respectively assigned as identification information to the plurality of storage regions, and the processor is configured to:
    extract the identification information of the storage region that has been most frequently accessed in the plurality of storage regions at the certain time interval based on the logs of the accesses, and
    specify the transition speed based on a difference between the number of the identification information at an end point of an identification group and the number of the identification information at a start point of the group and a difference between a first clock time when the number of the accesses to the storage region corresponding to the start point has reached a maximum number and a second clock time when the number of the accesses to the storage region corresponding to the end point reaches the maximum number when the identification information group including such numbers of two or more continuous identification information items that a difference between the numbers of two adjacent identification information items is within a certain range from among the plurality of numbers of the identification information extracted at the certain time interval has been extracted.

9. The information processing apparatus according to claim 8, wherein the processor is configured to:
    extract the identification information of the plurality of storage regions and the number of accesses from the logs of the accesses at the certain time interval,
    extract latest identification information as the identification information of the storage region that has been most frequently accessed at the latest timing from the logs of the accesses,
    specify the oldest timing when the number of the accesses to the storage region corresponding to the latest identification information is equal to or greater than a first certain value at timing before the latest timing based on the identification information of the plurality of storage regions extracted at the certain time interval and the number of the accesses, and
    specify the first time period based on a difference between the latest timing and the oldest timing.

10. The information processing apparatus according to claim 8, wherein the processor is configured to predict the first storage region by using an Equation (1):

$$[\text{the number of the identification information of the first storage region}] = [\text{the number of the identification information of a second storage region}] + ([\text{current time}] - [\text{clock time when the data stored in the second storage region is moved to the first storage region}] + [\text{the first time period}]) * [\text{the transition speed}] \quad \text{Equation (1).}$$

11. A method executed by an information processing apparatus configured to control moving of data stored in a first storage region selected from a plurality of storage regions of a first storage device to a second storage device, the method comprising:
    executing a collection of logs of accesses to the plurality of storage regions respectively;
    specifying, from the plurality of storage regions based on the logs of the accesses, an access concentration region in which a number of the accesses per a certain time unit is equal to or greater than a first number;
    specifying, based on the logs of the accesses, a transition speed of the access concentration region when the access concentration region is transited between the plurality of storage regions;

specifying, based on the logs of the accesses, a first time period in which the number of the accesses to a certain storage region of a plurality of storage regions changes from a second number less than the first number to the first number;

predict, based on the transition speed and the first time period, the number of accesses to the first storage region becomes equal to or greater than the first number at a first time; and moving data stored in the first storage region to the second storage device at a certain time which is determined based on the first time.

12. The method according to claim 11, wherein obtaining of the logs of the accesses is executed at a certain time interval.

13. The method according to claim 11, wherein the moving of the data is executed before the number of the accesses to the first storage region becomes equal to or greater than the first number.

14. The method according to claim 11, wherein the plurality of storage regions are regions obtained by dividing a storage volume of the first storage device into certain sizes and are regions of minimum units of moving of data from the first storage device to the second storage device.

15. The method according to claim 11, wherein a speed of the access to the first storage device is lower than a speed of the access to the second storage device.

16. The method according to claim 15, wherein the first storage device is a hard disk drive, and the second storage device is a solid state drive.

17. The method according to claim 11, wherein the transition speed is defined by the number of storage regions where the access concentration region has transited in a certain time unit.

* * * * *